(12) United States Patent
Landa et al.

(10) Patent No.: US 11,975,552 B2
(45) Date of Patent: May 7, 2024

(54) METHODS FOR PREPARING COMPOSITIONS COMPRISING CARBON BLACK

(71) Applicant: LANDA LABS (2012) LTD., Rehovot (IL)

(72) Inventors: Benzion Landa, Nes Ziona (IL); Sagi Abramovich, Ra'anana (IL); Amir Lion, Kfar Maas (IL); Amit Haviv, Petach Tikva (IL)

(73) Assignee: LANDA LABS (2012) LTD., Rehovot (IL)

( * ) Notice: Subject to any disclaimer, the term of this patent is extended or adjusted under 35 U.S.C. 154(b) by 0 days.

(21) Appl. No.: 17/844,119

(22) Filed: Jun. 20, 2022

(65) Prior Publication Data

US 2023/0001727 A1     Jan. 5, 2023

Related U.S. Application Data

(60) Division of application No. 16/424,721, filed on May 29, 2019, now Pat. No. 11,390,103, which is a continuation of application No. PCT/IB2017/057557, filed on Nov. 30, 2017.

(30) Foreign Application Priority Data

Nov. 30, 2016   (WO) ................. PCT/IB2016/057226

(51) Int. Cl.
| | | |
|---|---|---|
| *C08G 77/04* | (2006.01) | |
| *B41J 2/005* | (2006.01) | |
| *B41J 2/447* | (2006.01) | |
| *B41J 11/00* | (2006.01) | |
| *B41M 5/025* | (2006.01) | |
| *B41M 5/03* | (2006.01) | |
| *B41M 5/52* | (2006.01) | |
| *C08K 3/04* | (2006.01) | |
| *C08K 3/36* | (2006.01) | |
| *C08K 5/5419* | (2006.01) | |
| *C08K 5/544* | (2006.01) | |
| *C08L 83/04* | (2006.01) | |
| *C09C 1/56* | (2006.01) | |
| *C09C 3/10* | (2006.01) | |
| *C09D 7/40* | (2018.01) | |
| *G03G 15/16* | (2006.01) | |
| *G03G 15/32* | (2006.01) | |
| *G03G 15/34* | (2006.01) | |
| *B41J 2/45* | (2006.01) | |

(52) U.S. Cl.
CPC ............ *B41M 5/025* (2013.01); *B41J 2/0057* (2013.01); *B41J 2/447* (2013.01); *B41J 11/0024* (2021.01); *B41M 5/0256* (2013.01); *B41M 5/03* (2013.01); *B41M 5/52* (2013.01); *C08G 77/04* (2013.01); *C08K 3/04* (2013.01); *C08K 3/36* (2013.01); *C08K 5/5419* (2013.01); *C08K 5/544* (2013.01); *C09C 1/56* (2013.01); *C09C 3/10* (2013.01); *G03G 15/162* (2013.01); *G03G 15/326* (2013.01); *G03G 15/342* (2013.01); *B41J 2/45* (2013.01); *B41M 2205/06* (2013.01); *B41M 2205/10* (2013.01); *C01P 2004/04* (2013.01); *C01P 2004/50* (2013.01); *C01P 2004/61* (2013.01); *C01P 2004/62* (2013.01); *C01P 2006/12* (2013.01); *C01P 2006/19* (2013.01); *C08K 2201/005* (2013.01); *C08L 83/04* (2013.01); *C09D 7/66* (2018.01)

(58) Field of Classification Search
CPC ........................................................ C08K 3/04
See application file for complete search history.

(56) References Cited

FOREIGN PATENT DOCUMENTS

| | | | |
|---|---|---|---|
| GB | 2474474 A | * 4/2011 | .............. C08L 83/04 |
| JP | 2011257520 A | * 12/2011 | |

* cited by examiner

*Primary Examiner* — Wenwen Cai
(74) *Attorney, Agent, or Firm* — Momentum IP; Marc Van Dyke

(57) ABSTRACT

There are disclosed curable elastomeric compositions comprising at least one reactive curable silicone pre-polymer capable of forming a silicone elastomer upon curing thereof, and a plurality of hydrophilic carbon black particles dispersed therein, as well as their corresponding cured products. Such compositions, once cured, can be used for the preparation of numerous articles of wide industrial applicability.

21 Claims, 4 Drawing Sheets

METHODS FOR PREPARING COMPOSITIONS COMPRISING CARBON BLACK

CROSS-REFERENCE TO RELATED APPLICATIONS

This patent application is a divisional of U.S. application Ser. No. 16/424,721, which was filed on May 29, 2019, and which is incorporated herein by reference in its entirety. U.S. application Ser. No. 16/424,721 is a continuation-in-part of PCT/IB2017/057557, filed on 30 Nov. 2017, which is incorporated by reference in its entirety. PCT/IB2017/057557 claims Paris Convention priority from PCT/IB2016/057226, filed on 30 Nov. 2016 which is incorporated by reference in its entirety.

FIELD

The present disclosure relates to elastomers comprising carbon-based particles and methods of preparing the same. In particular, there are provided silicone-based compositions comprising oxidized carbon black particles.

BACKGROUND

Elastomers comprising solid particles providing a variety of desired properties to such elastomers are known in numerous industrial fields. By way of example, the particles may contribute to esthetical aspects of the elastomers, pigments for instance provide a desired color or tinting, they may modify mechanical properties, such as hardness, abrasion resistance, wear resistance, tensile and tear strengths and the like, or impart or modulate any other physical property of the matrix comprising them, including thermal conductivity, electrical conductivity, or radiation absorption.

Depending on the end-use of the elastomer, the desired particles may have a variety of suitable regular or irregular shapes, in a wide range of sizes from a few nanometers to tens of micrometers. While not necessarily essential, many industrial applications prefer the particles to be homogeneously dispersed across the elastomer matrix. An adequate dispersion of particles within an elastomer generally requires "compatibility" between the two types of components. For instance, the particles may interact with the polymer matrix via hydrophobic:hydrophobic interactions, or via charge interactions and like mechanisms well known in the art of elastomers comprising particles. While these two components may inherently have properties rendering them compatible one with the other, it is also possible to rely on materials modified to increase such compatibility, which under favorable conditions may even result in superior dispersibility of the particles within the elastomeric matrix. For instance, there have been reports that functionalized polymers are more suitable than their non-functionalized counterparts to disperse certain particles. Alternatively, or additionally, the particles could be modified to better interact with the polymer matrix. Additional agents, such as surfactants or dispersants, can also be incorporated in elastomeric compositions comprising particles to enable or facilitate the desirable dispersion. Elastomeric compositions having a higher complexity (e.g., more constituents, more demanding characteristics, improved dispersion homogeneity, etc.) can be more challenging to prepare.

Elastomers that may benefit from the proper dispersion of particles within their matrix include natural and synthetic materials, silicone rubbers being of particular interest for innovative applications like electronic devices, medical applications or low and high temperature uses (e.g., remaining flexible and/or resilient between $-125°$ C. and $+250°$ C.). Among the various types of particles that may advantageously be dispersed in elastomeric matrix such as prepared from silicone polymers, are carbon-based particles, such as graphene, graphite and carbon black (CB). CB, which has various sub-types, is of extensive interest. Among other functions, CB can be used as a pigment, as a reinforcement filler, as a thermal conductor, as an electrical conductor or as a radiation-absorber.

SUMMARY

According to an aspect of the present invention there is provided a method of producing, from hydrophilic carbon black particles and at least one curable, hydrophobic silicone pre-polymer, an elastomeric composition containing dispersed carbon black particles, the method comprising: a) providing treated carbon black particles including a dispersant, said dispersant being miscible in the at least one curable, hydrophobic silicone pre-polymer, said dispersant having at least one carbon-black-affinic moiety having affinity to a hydrophilic surface of the hydrophilic carbon black particles; b) mixing said treated carbon black particles within the at least one curable hydrophobic silicone pre-polymer to produce a dispersed composition; and c) addition-curing the at least one curable hydrophobic silicone pre-polymer of said dispersed composition to produce the elastomeric composition containing the dispersed carbon black particles.

In some embodiments, the method further comprises, prior to providing the treated carbon black particles, contacting the hydrophilic carbon black particles with a dispersant to produce said treated carbon black particles According to another aspect, there is provided a method of producing, from hydrophilic carbon black particles and at least one curable, hydrophobic silicone pre-polymer, an elastomeric composition containing dispersed carbon black particles, the method comprising: a) contacting the hydrophilic carbon black particles with a dispersant to produce treated carbon black particles, said dispersant being miscible in the at least one curable, hydrophobic silicone pre-polymer, said dispersant having at least one carbon-black-affinic moiety having affinity to a hydrophilic surface of the hydrophilic carbon black particles; b) mixing said treated carbon black particles within the at least one curable hydrophobic silicone pre-polymer to produce a dispersed composition; and c) addition-curing the at least one curable hydrophobic silicone pre-polymer of said dispersed composition to produce the elastomeric composition containing the dispersed carbon black particles.

In some embodiments, providing the treated carbon black particles or contacting the particles with a dispersant to obtain the same includes size-reducing the hydrophilic carbon black particles in the presence of said dispersant to produce said treated carbon black particles.

In some embodiments, the method further comprises size-reducing the hydrophilic carbon black particles in the presence of said dispersant to produce said treated carbon black particles.

In some embodiments, the size-reducing is performed so as to reduce the particle size of the hydrophilic carbon black particles such that a Dv90 of said treated carbon black particles is at most 5 μm, at most 3 μm, at most 2 μm, at most 1.5 μm, at most 1.2 μm, at most 1 μm, at most 0.85 μm, at most 0.7 μm, at most 0.5 μm, at most 0.4 μm, at most 0.3 μm, and optionally, at least 0.10 μm, at least 0.12 μm, or at least 0.15 μm.

In some embodiments, this size-reducing is performed so as to reduce the particle size of the hydrophilic carbon black particles such that a Dv90 of said treated carbon black particles is within a range of 0.10 μm to 1.3 μm, 0.12 μm to 1.3 μm, 0.15 μm to 1.3 μm, 0.20 μm to 1.3 μm, 0.25 μm to 1.3 μm, 0.3 μm to 1.3 μm, 0.20 μm to 1.0 μm, 0.25 μm to 1.0 μm, 0.3 μm to 1.0 μm, 0.35 μm to 1.0 μm, or 0.4 μm to 1.0 μm.

In some embodiments, the pH value of the hydrophilic carbon black particles, as may be determined according to DIN ISO 787-9, or by other means known to those of skill in the art, is at most 5.0, at most 4.5, at most 4.0, at most 3.5, at most 3.0, or at most 2.7.

In some embodiments, this pH value may be at least 1.5, at least 2.0, at least 2.2, or at least 2.4.

In some embodiments, the volatile matter content of the hydrophilic carbon black particles, in percent, as may be determined according to DIN 53552, or by other means known to those of skill in the art, is at least 1.5%, at least 2.5%, at least 3.5%, at least 5%, at least 8%, at least 10%, at least 12%, at least 15%, or at least 18%.

In some embodiments, this specific volatile matter content is at most 50%, at most 35%, at most 30%, at most 27%, at most 25%, or at most 22%.

In some embodiments, the specific volatile matter content of the hydrophilic carbon black particles, defined by the volatile matter content of the hydrophilic carbon black particles, in percent, as may be determined according to DIN 53552, or by other means known to those of skill in the art, divided by a BET surface area, as may be determined according to ASTM D6556, or by other means known to those of skill in the art, is at least 0.01%, at least 0.012%, at least 0.015%, at least 0.018%, at least 0.02%, at least 0.022%, at least 0.025%, at least 0.028%, at least 0.03%, at least 0.032%, at least 0.035%, or at least 0.037%.

In some embodiments, this BET-based specific volatile matter content is at most 0.10%, at most 0.09%, at most 0.08%, at most 0.07%, or at most 0.06%.

In some embodiments, the specific volatile matter content of the hydrophilic carbon black particles, defined by the volatile matter content of the hydrophilic carbon black particles, in percent, as may be determined according to DIN 53552, or by other means known to those of skill in the art, multiplied by an average primary particle size (APPS), in nanometers, as provided by a manufacturer of said hydrophilic carbon black particles, or as determined according to dynamic light scattering (DLS), is at least 40%, at least 50%, at least 60%, at least 75%, at least 100%, at least 120%, at least 150%, at least 180%, at least 200%, at least 220%, or at least 250%.

In some embodiments, this APPS-based specific volatile matter content is at most 600%, at most 500%, at most 400%, at most 350%, or at most 300%.

In some embodiments, the surface Zeta potential of the hydrophilic carbon black particles in distilled water, measured at a pH of 12, and measured at a concentration within a range of 0.1 to 2 wt. %, is at most −15 mV, at most −20 mV, at most −25 mV, at most −30 mV, at most −35 mV, or at most −40 mV.

In some embodiments, this surface Zeta potential is within a range of −70 to −15 mV, −70 to −20 mV, −70 to −25 mV, −70 to −30 mV, −70 to −35 mV, −60 to −15 mV, −60 to −20 mV, −60 to −25 mV, or −60 to −30 mV.

In some embodiments, the acid value of the hydrophilic carbon black particles, in mmol/g, is at least 0.05, at least 0.06, at least 0.075, at least 0.1, at least 0.125, at least 0.15, or at least 0.175.

In some embodiments, this acid value is at most 0.5, at most 0.4, at most 0.3, or at most 0.25.

In some embodiments, this acid value is within a range of 0.05 to 0.35, 0.06 to 0.35, 0.08 to 0.35, 0.1 to 0.35, 0.05 to 0.3, 0.06 to 0.3, 0.08 to 0.3, 0.1 to 0.3, 0.05 to 0.25, 0.08 to 0.25, 0.1 to 0.25, 0.12 to 0.25, or 0.15 to 0.25.

In some embodiments, the hydrophilic carbon black particles readily form a dispersion in distilled water at a pH of 7.0, the hydrophilic carbon black particles making up 5% of said dispersion, on a weight-weight basis.

In some embodiments, the hydrophilic carbon black particles have at least one of the following properties: i) an $I_D/I_G$ ratio of at least 0.8, or at least 1.0, or at least 1.2, wherein $I_D$ and $I_G$ represent peak intensity maxima of D-band and G-band, respectively, of undeconvoluted Raman spectroscopy spectra; ii) an $AUC_D/AUC_G$ ratio of at least 1.2, or at least 1.4, or at least 1.6, wherein $AUC_D$ and $AUC_G$ represent the area under the curve of D-band and G-band, respectively, of deconvoluted Raman spectroscopy spectra; and iii) contain at least one type of functional group selected from the group consisting of epoxy, hydroxy and carboxylic moieties, as detected by Fourier-transform infrared (FTIR) spectroscopy.

In some embodiments, the obtained cured elastomeric composition is characterized by at least one of the following properties: i) contains platinum or tin catalyst, as detected by ICP, GCMS, elemental analysis or EDS; ii) contains at least one type of functional group selected from the group consisting of amine, amide, epoxy and acrylate moieties, as detected by Fourier-transform infrared (FTIR) spectroscopy; iii) contains dispersed carbon black particles having an $I_D/I_G$ ratio of at least 0.8, or at least 1.0, or at least 1.2, wherein $I_D$ and $I_G$ represent peak intensity maxima of D-band and G-band, respectively, of undeconvoluted Raman spectroscopy spectra; iv) contains dispersed carbon black particles having an $AUC_D/AUC_G$ ratio of at least 1.2, or at least 1.4, or at least 1.6, wherein $AUC_D$ and $AUC_G$ represent the area under the curve of D-band and G-band, respectively, of deconvoluted Raman spectroscopy spectra; and v) contains dispersed carbon black particles having a Dv90 particle size of at most 5 μm, as determined by light microscopy.

In some embodiments, for at least one of (A) the hydrophilic carbon black particles, and (B) the dispersed carbon black particles, the $I_D/I_G$ ratio is at most 2.2, at most 2.0, at most 1.8, or at most 1.6, and/or the $AUC_D/AUC_G$ ratio is at most 2.5, at most 2.2, or at most 2.0.

In some embodiments, the addition-curing is effected in a presence of at least one addition-curing promoter.

In some embodiments, the at least one addition-curing promoter includes an addition-cure catalyst.

In some embodiments, the at least one addition-cure promoter includes an addition-cure accelerator.

In some embodiments, the at least one addition-cure promoter includes at least one three-dimensional network former.

In some embodiments, the at least one three-dimensional network former includes a hydrophobic fumed silica.

In some embodiments, the at least one three-dimensional network former has a refractive index within 10%, within 7%, within 5%, or within 3% of a refractive index of the elastomeric composition or of the at least one curable, hydrophobic silicone pre-polymer, after curing.

In some embodiments, the method further comprises introducing an addition-cure retardant prior to said addition-curing of the at least one curable hydrophobic silicone pre-polymer.

In some embodiments, the addition-curing is effected in a presence of at least one cross-linking agent.

In some embodiments, the dispersant having the at least one carbon-black-affinic moiety is, includes, mainly includes, or consists essentially of a branched molecule having a backbone having A atoms, and N branching units branching from said backbone, A being at least 50, and N being at least one, wherein at least one of said backbone and said one or more branching units is siloxane-based, or contains at least one siloxane unit.

In some embodiments, A is at least 60, at least 80, at least 100, or at least 110.

In some embodiments, A is at most 3000, at most 2500, at most 2000, at most 1500, at most 1200, or at most 1000.

In some embodiments, A is within a range of 55 to 3000, 65 to 2000, 75 to 1500, 90 to 1500, 105 to 1500, 105 to 1200, or 105 to 1000.

In some embodiments, each branching unit has a branch spine attached to said backbone, and said branch spine has at least B atoms, wherein B is at least 4, at least 5, at least 6, or at least 8.

In some embodiments, the branch spine has at most B atoms, wherein B is at most 50, at most 25, at most 15, or at most 10.

In some embodiments, N is at most 15, at most 12, at most 10, at most 8, at most 6, at most 5, or at most 4.

In some embodiments, N is at least 2 or at least 3.

In some embodiments, the at least one carbon-black-affinic moiety is disposed within said branching units, said backbone of said dispersant being a siloxane-containing or siloxane-based backbone.

In some embodiments, the at least one carbon-black-affinic moiety is disposed within said backbone, said branching units of said dispersant being siloxane-containing or siloxane-based branching units.

In some embodiments, the method further comprises, subsequent to producing said dispersed composition and prior to said addition-curing, applying said dispersed composition to a substrate.

In some embodiments, the at least one carbon-black-affinic moiety is selected from an amino moiety, an acrylate moiety and an epoxy moiety.

In some embodiments, the at least one silicone dispersant is selected from the group consisting of an amino-silicone dispersant, a silicone-acrylate dispersant, and a silicone-epoxy dispersant.

In some embodiments, the dispersant is, includes or essentially consists of a silicone-acrylate dispersant.

In some embodiments, the dispersant is, includes or essentially consists of an amino-silicone dispersant.

In some embodiments, the dispersant is, includes or essentially consists of a silicone-epoxy dispersant.

In some embodiments, the amino-silicone dispersant is, includes, mainly includes, or consists essentially of an amino-silicone oil.

In some embodiments, the amino-silicone oil has an amine number, measured in ml of 0.1N HCl titrant required to neutralize 10 grams of said amino-silicone oil, and wherein said amine number is at most 80, at most 70, at most 60, at most 50, at most 45, at most 40, at most 35, at most 30, at most 25, or at most 20.

In some embodiments, this amine number is at least 3, at least 4, at least 5, at least 6, or at least 7.

In some embodiments, this amine number is within a range of 3-75, 3-65, 3-55, 4-75, 4-65, 4-55, 4.5-50, 5-75, 5-65, 5-55, 6-75, 6-65, 6-55, or 6.5-50.

In some embodiments, the dispersant, when disposed in a synthetic isoparaffinic hydrocarbon solvent (e.g., Isopar™ L), is a micelle-forming dispersant.

Typically, micelles formed by the micelle-forming dispersant in the synthetic isoparaffinic hydrocarbon solvent such as are inverse micelles.

In some embodiments, the method further comprises, prior to said addition-curing of the at least one curable hydrophobic silicone pre-polymer, diluting said dispersed composition with at least one volatile solvent.

In some embodiments, the dispersant is, includes, mainly includes, or consists essentially of a siloxane-containing or siloxane-based dispersant.

Typically, the dispersant is selected and/or adapted to disperse the hydrophilic carbon black particles.

In some embodiments, the volatile organic solvent includes at least one of xylene, a synthetic isoparaffinic hydrocarbon solvent (e.g., Isopar™ L, M or G), an organo-silicone solvent such as hexamethyldisiloxane and a hydrocarbon solvent (e.g., hexane).

In some embodiments, the dispersed carbon black particles are hydrophobic dispersed carbon black particles.

In some embodiments, the concentration of the carbon black particles within the dispersed composition, by weight, is at least 0.01%, at least 0.02%, at least 0.03%, at least 0.1%, at least 0.25%, at least 0.5%, at least 1%, at least 1.5%, at least 2%, or at least 3% by weight of the total composition.

In some embodiments, the concentration of the carbon black particles within the dispersed composition is at least 5%, at least 7.5%, at least 10%, at least 11%, at least 12%, at least 13%, at least 14%, at least 15%, at least 16%, at least 17%, at least 18%, or at least 19%, by weight of the total composition.

In some embodiments, the concentration of the carbon black particles within the dispersed composition, by weight, is at most 30%, at most 27.5%, at most 25%, at most 22.5%, or at most 20%. In some embodiments, the concentration of the carbon black particles within the dispersed composition, by weight, is at most 15%, at most 12%, at most 10%, at most 8%, at most 6%, at most 5%, or at most 4%, by weight of the total composition.

In some embodiments, the concentration of the carbon black particles within the dispersed composition, by weight, is in a range between 5% and 30%, between 10% and 30%, between 12% and 30%, between 15% and 30%, between 17.5% and 30%, between 20% and 30%, between 10% and 27.5%, between 12% and 27.5%, between 13% and 25%, or between 15% and 25% by weight of the total composition.

According to another aspect of the present invention there is provided a method of producing an elastomeric composition containing dispersed carbon black particles, the method comprising: a) mixing, with at least one curable hydrophobic silicone pre-polymer, carbon black particles, each being associated with, or at least partially enveloped by, at least one siloxane-containing or silicone-based dispersant, to produce a dispersed composition; b) addition-curing said at least one curable hydrophobic silicone pre-polymer to produce the elastomeric composition containing the dispersed carbon black particles.

This method may further include any feature or features described hereinabove, or in the description provided hereinbelow, or any combination of those features.

According to another aspect of the present invention there is provided a method of producing, from hydrophilic carbon black particles and at least one curable, hydrophobic silicone pre-polymer, an elastomeric composition containing dispersed carbon black particles, the method comprising: a) contacting the hydrophilic carbon black particles with a dispersant to produce treated carbon black particles, said dispersant being miscible in the at least one curable, hydrophobic silicone pre-polymer; b) mixing said treated carbon black particles within the at least one curable hydrophobic silicone pre-polymer to produce a dispersed composition; and c) addition-curing the at least one curable hydrophobic silicone pre-polymer of said dispersed composition to produce the elastomeric composition containing the dispersed carbon black particles.

This method may further include any feature or features described hereinabove, or in the description provided hereinbelow, or any combination of those features.

According to another aspect of the present invention there is provided a composition comprising dispersed carbon black particles, each of said dispersed carbon black particles having a carbon-black core having an outer surface associated with, or at least partially enveloped by, at least one silicone dispersant selected from the group consisting of an amino-silicone dispersant, a silicone-acrylate dispersant, and a silicone-epoxy dispersant; said dispersed carbon black particles being characterized by at least one of the following: i) defective carbon black structure, as determined by Raman spectroscopy, for example, as manifested by at least one of $I_D/I_G$ ratio and $AUC_D/AUC_G$, or by other characteristics known to those of skill in the art of Raman spectroscopy; and ii) having hydrophobic characteristics, as manifested by at least one of: a contact angle formed by the meniscus at the liquid/air/solid interface exceeds 90°; phase separation of the dispersed carbon black particles in distilled water; and being readily dispersed in an isoparaffinic hydrocarbon solvent.

In the case of measuring the contact angle, the dispersed carbon black particles formed into a continuous flat surface, and the meniscus is then formed at the interface of the air and a drop of distilled water placed on that surface.

In some embodiments, the carbon black particles in the composition have a Dv90 particle size of at most 5 μm, at most 3 μm, at most 2 μm, at most 1.5 μm, at most 1 μm, at most 0.7 μm, at most 0.5 μm, at most 0.4 μm, or at most 0.3 μm, and optionally, at least at least 0.10 μm, at least 0.12 μm, or at least 0.15 μm, as may be determined by dynamic light scattering (DLS) or by a suitable microscopy instrumentation and technique.

In some embodiments, the carbon black particles in the composition have an $I_D/I_G$ ratio of at least 0.8.

This method may further include any feature or features described hereinabove, or in the description provided hereinbelow, or any combination of those features.

According to another aspect of the present invention there is provided an article comprising any of the above-referenced compositions containing the dispersed carbon black particles.

According to another aspect of the present invention there is provided a method of producing, from hydrophilic carbon black particles and at least one curable hydrophobic silicone pre-polymer, an elastomeric composition containing dispersed carbon black particles, the method comprising: a) contacting the hydrophilic carbon black particles with the curable hydrophobic silicone pre-polymer to produce treated carbon black particles, the curable hydrophobic silicone pre-polymer being condensation-curable and having at least one carbon-black-affinic moiety having affinity to a hydrophilic surface of the hydrophilic carbon black particles; b) mixing said treated carbon black particles within the at least one curable hydrophobic silicone pre-polymer to produce a dispersed composition; and c) condensation-curing the at least one curable hydrophobic silicone pre-polymer of the dispersed composition to produce the elastomeric composition containing the dispersed carbon black particles.

In some embodiments, the at least one carbon-black-affinic moiety is selected from the group consisting of an amino moiety, an acrylate moiety and an epoxy moiety.

This method may further include any feature or features described hereinabove, or in the description provided hereinbelow, or any combination of those features, that are compatible with condensation curing.

According to another aspect of the present invention there is provided a method of producing, from hydrophilic carbon black particles and at least one condensation-curable hydrophobic silicone pre-polymer, an elastomeric composition containing dispersed carbon black particles, the method comprising: a) contacting the hydrophilic carbon black particles with a dispersant to produce treated carbon black particles, said dispersant being miscible in the at least one condensation-curable, hydrophobic silicone pre-polymer, said dispersant having at least one carbon-black-affinic moiety having affinity to a hydrophilic surface of the hydrophilic carbon black particles b) mixing said treated carbon black particles within the at least one condensation-curable hydrophobic silicone pre-polymer to produce a dispersed composition; and c) condensation-curing the at least one condensation-curable hydrophobic silicone pre-polymer to produce the elastomeric composition containing the dispersed carbon black particles.

This method may further include any feature or features described hereinabove, or in the description provided hereinbelow, or any combination of those features, that are compatible with condensation curing.

According to another aspect of the present invention there is provided an article made of, or containing in at least a portion of the article, a cured composition containing dispersed carbon black particles. This cured composition may be prepared according to any one of the methods provided herein, or any combination of such methods. Moreover, this cured composition may contain any of the structural features of the cured composition as described herein, as well as any of the structural features of the cured composition that are inherent in a cured composition produced according to any of the production methods provided herein.

In some embodiments, the cured composition contains at least a trace or detectable quantity of at least one addition-cure catalyst, such as platinum and tin.

In some embodiments, the cured composition contains amino-silicone.

In some embodiments, the cured composition contains at least a trace or detectable quantity of platinum or tin, and further contains amino-silicone.

Without wishing to be bound by theory, the inventors believe that in using hydrophilic carbon black particles as the CB raw material for contacting with the siloxane-containing or silicone-based (silicone-compatible) dispersant in the size reduction process, carbon-black-affinic (amino, acrylate, and epoxy) functional groups or moieties may bond or otherwise associate with various oxygen-containing moieties disposed on a surface of the hydrophilic carbon black particles. The association may be sufficiently strong so as to anchor at least one of these large dispersant molecules to each one of the carbon black particles, to form a structure in which the carbon black particles become core particles that are at least partially enveloped by the dispersant molecule. Thus, from hydrophilic carbon black particles, treated carbon black particles exhibiting hydrophobic—or even highly hydrophobic—behavior, are surprisingly produced.

The above-referenced carbon-black-affinic moieties are preferably disposed in molecular positions having low steric hindrance. Thus, these moieties may be disposed on branches or branch units that extend away from the backbone of the dispersant molecule.

Each branching unit has a branch spine attached to said backbone, the spine typically having at least B atoms, wherein B is at least 3, at least 4, at least 5, at least 6, or at least 8. The functional group (e.g., an amine moiety) may preferably be disposed at least 3, at least 4, at least 5, or at least 6 atoms from the dispersant backbone, so as to be sufficiently sterically unhindered so as to attach to the oxygen-bearing surface of the carbon black particle and thus anchor the dispersant so as to at least partially envelop the surface of the carbon black particle. Typically, the end or terminus moiety of the branch of the dispersant molecule is a functional group.

In addition, the inventors were motivated to incorporate these treated carbon black particles within a silicone matrix, which may be highly hydrophobic. The inventors found that these treated carbon black particles must be sufficiently hydrophobic and silicone-affinic to be miscible in the curable, hydrophobic silicone pre-polymer. Thus, the dispersant molecules must both exhibit a hydrophilic affinity so as to attach to the hydrophilic/polar oxygen-bearing surface of the carbon black particles, while exhibiting sufficient hydrophobic behavior to be suitably miscible in the hydrophobic and essentially non-polar silicone matrix. While being sufficiently hydrophilic to achieve the aforesaid purpose, the dispersant is essentially water-immiscible, as miscibility in water would render it incompatible with the silicone matrix.

The inventors have observed that a high siloxane content in the backbone of the molecule, in the branches extending from the backbone, or both, strongly promotes the miscibility of the dispersant molecule.

While at high concentrations of sterically available functional groups in the dispersant molecule, the attachment to the oxygen-bearing surface of the carbon black particle may be appreciably enhanced, the inventors have further found that such high concentrations may reduce the miscibility of the dispersant molecule in the hydrophobic silicone pre-polymer. Thus, for amino-silicones, by way of example, the amine number (defined herein) may be at most 150, at most 130, at most 100, and more typically, at most 80, or yet lower. In order for the dispersant molecule to be sufficiently active with respect to the oxygen-bearing surface of the carbon black particle, the amine number may be at least 3, at least 4, or at least 5, and typically more than 5.

With regard to the length of the dispersant backbone, the inventors have found that this length may be tailored to the desired carbon black particle size. This length, expressed as the number of atoms making up the backbone, may be within a wide range, e.g., 55 to 3000 atoms. However, for smaller carbon black (secondary) particle sizes, e.g., for a Dv50 of 100 nm, the number of atoms making up the backbone may be 55 to 1000 atoms, 65 to 900 atoms, or 75 to 800 atoms.

BRIEF DESCRIPTION OF THE DRAWINGS

Some embodiments of the invention are described herein with reference to the accompanying drawings. The description, together with the figures, makes apparent to a person having ordinary skill in the pertinent art how the teachings of the disclosure may be practiced, by way of non-limiting examples. The figures are for the purpose of illustrative discussion and no attempt is made to show structural details of an embodiment in more detail than is necessary for a fundamental and enabling understanding of the disclosure. For the sake of clarity and simplicity, some objects depicted in the figures may not be drawn to scale.

FIG. 2A shows an image of CB particles dispersed within the matrix according to some embodiments of the invention;

FIG. 2B is a schematic representation of the dispersed particles shown in FIG. 2A;

FIG. 2C shows an image of aggregates of CB of a similar source in a similar matrix, as shown in FIG. 2A, the particles not being subjected to a milling step;

FIG. 2D is a schematic representation of the aggregated particles shown in FIG. 2C;

FIG. 2E shows an image of different commercially available CB particles blended in a matrix similar as shown in FIG. 2A;

FIG. 2F is a schematic representation of the commercially available particles shown in FIG. 2E;

FIG. 2G shows an image of CB particles having collapsed out of dispersed state;

FIG. 2H depicts a schematic representation of the collapsed particles shown in FIG. 2G;

DETAILED DESCRIPTION

Figure 1:
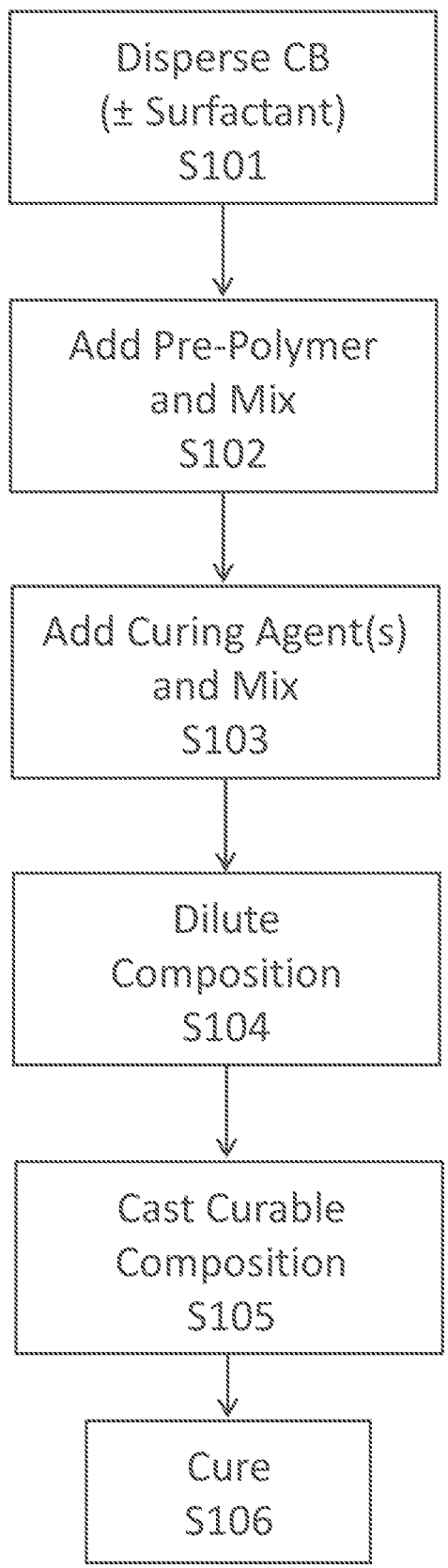
FIG. 1 depicts a simplified schematic diagram of a method for preparing compositions according to various embodiments of the present teachings.

As used herein in the specification and in the claims section that follows, the term "readily disperse", "readily form a dispersion", and the like, with respect to carbon black particles, is used to describe a 5% (wt./total wt.) suspension of the CB particles in distilled water that disperses, to the eye, by means of gentle shaking by hand, typically within 5 seconds.

As used herein in the specification and in the claims section that follows, the term "siloxane" refers to the functional group illustrated in Formula (1)

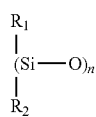 (1)

wherein $R_1$ and $R_2$ are independently selected from H and Alkyl. n is between 30 and 1500, 30 and 1000, 40 and 750 and 40 and 600.

As used herein in the specification and in the claims section that follows, the term "siloxane-containing" with regard to a dispersant molecule, refers to a dispersant molecule having at least one siloxane unit.

As used herein in the specification and in the claims section that follows, the term "siloxane-based" with regard to a dispersant molecule, refers to a dispersant molecule having at least one of:
(i) at least 10 wt. % siloxane, and more typically, at least 20 w. %, at least 35 weight %, at least 50 weight %, at least 60 weight %, or at least 70 wt. % siloxane; and
(ii) sufficient siloxane groups to be identified by FTIR analysis of the dispersant, or of a composition containing the dispersant and carbon black.

As used herein in the specification and in the claims section that follows, the term "miscible" and the like, with regard to a dispersant in a solvent or matrix, refers to a dispersant solubility, measured at room temperature (25° C.), that is at least 0.03% on a weight basis, i.e., the dispersant weight divided by total weight (dispersant weight+weight of the solvent/matrix) in a pure component system. Specifically, with regard to a dispersant in a curable, hydrophobic silicone pre-polymer, "miscible" and the like refers to a dispersant solubility that is at least 0.03% on a basis of dispersant weight divided by the total weight of the dispersant and the curable, hydrophobic silicone pre-polymer.

Typically, this dispersant is selected to have a solubility, by weight, of at least 3%, or at least 5%, and more typically, at least 7%, at least 10%, at least 12%, at least 15%, at least 20%, or at least 25%. In many cases, solubility of a suitable dispersant is at most 70%, at most 60%, at most 50%, at most 40%, at most 35%, or at most 30%.

A suitable dispersant can additionally be selected to have a solubility, in weight %, of typically at least 0.3 times the weight % of the CB in the composition, and more typically, at least 0.5, at least 0.7, at least 0.8, at least 0.9, or at least 1.0 times the weight % of the CB in the composition.

The dispersant should be selected so that its solubility in the curable composition at the aforesaid concentrations and/or weight ratios with respect to additional constituents (e.g., CB particles) is such that phase separation is avoided. In other words, a dispersant is miscible in a solvent or in a composition comprising silicone pre-polymers and carbon black particles if all constituents substantially form a single phase.

As used herein in the specification and in the claims section that follows, the term "spine" with respect to a branch of a polymeric molecule, refers to the backbone unit of that branch.

As used herein in the specification and in the claims section that follows, the term "non-reactive amino-silicone oil" refers to an amino-silicone oil that fulfills at least one, and preferably both, of the following structural properties: (i) the amino-silicone oil is devoid of silanol and alkoxy groups; and (ii) the amino-silicone oil is non-reactive with respect to vinyl and silanol moieties, at typical addition-curing temperatures (such as from about 90° C. to about 200° C.), or at the actual, utilized addition-curing temperature.

As used herein in the specification and in the claims section that follows, the term "volatile", with respect to a solvent in a dispersed (CB) composition, refers to a solvent having a sufficiently low vapor pressure or partial vapor pressure so as to substantially evaporate under the curing conditions of the curable, hydrophobic silicone pre-polymer within the dispersed composition.

As used herein in the specification and in the claims section that follows, the term "as determined by light microscopy", refers to dynamic light microscopy (DLS) for suitable samples, and area analysis within a representative field of view for samples unsuitable for DLS, such as a cured composition or an article containing such a cured composition.

Provided in the present invention are curable elastomeric compositions comprising carbon-based materials, in particular carbon black (CB) particles, as well as their corresponding cured products. These curable and cured compositions can have a wide range of applications in a variety of industrial fields (e.g., in fields where CB can serve for its mechanical properties, for its heat conductive properties, for its electrical conductive properties, and other properties of this material). This disclosure is particularly concerned with compositions wherein the elastomer is a silicone polymer and wherein the CB particles are in the low micron (e.g., between about 1 μm and 10 μm) to sub-micron range, as further detailed herein-below. In some embodiments, the CB particles are substantially evenly distributed within the compositions. Surprisingly, such compositions comprising hydrophobic silicone pre-polymers or resulting elastomer have been achieved using hydrophilic carbon black. Methods for preparing such compositions are also disclosed.

In some embodiments, the carbon black containing compositions or method of preparing the same can be used for the preparation of intermediate transfer members for indirect printing systems. Examples for such printing systems and transfer members are described in co-pending application PCT/IB2017/057535 filed on Nov. 30, 2017, by the same Applicant. Manufacturing methods of a layered article, wherein a layer might include a cured composition according to the present teachings, are described in co-pending application PCT/IB2017/053181 filed on May 30, 2017, by the same Applicant. The compositions of the present invention can be used additionally as sealants which UV-absorbing properties are of interests (e.g., windows).

As used herein, and unless otherwise stated or clear from context, the elastomeric compositions according to the present teachings encompass the curable compositions and the cured compositions resulting therefrom.

Curable compositions generally refer to compositions comprising materials that may cross-link with one another, or even self-polymerize, subsequently forming a polymer matrix having a molecular weight higher than its constituting uncured "pre-polymer" components. Pre-polymers can be, by way of example, monomers, oligomers or polymers having cross-linkable moieties allowing them to form, under specific conditions, more complex networks, often referred to as polymer matrices. While certain pre-polymers may have cross-linkable moieties that can readily interact with moieties of additional pre-polymers upon mixing therewith, other may require the addition of cross-linkers.

In some cases, the cross-linking of the pre-polymers can be facilitated by chemical agents known as curing facilitators or promoters, which include, by way of example, curing catalysts and curing accelerators. While curing catalysts are not consumed during the curing process, the accelerators may become part of the polymer matrix or be otherwise modified during the curing process, so as to be "consumed" as cross-linking progresses. Additional curing promoters include three-dimensional network formers, such as hydrophobic fumed silica. Conversely, the curing process can be delayed by retarding agents.

Cured compositions generally refer to compositions wherein at least a portion of the cross-linkable moieties of the constituents of a curable composition have reacted or otherwise interacted with one another. Typically, curing of pre-polymers of a curable composition towards a cured composition can be monitored over time by a change in the mechanical properties of the composition (e.g., an increase in viscosity, hardness, stretchability, and the like) and/or in its physico-chemical properties (e.g., melting temperature, glass transition temperature, and the like). In early stages of the process, the compositions are considered at least partially cured. A composition is considered fully cured once all cross-linkable moieties able to react/interact with one another are actually engaged in such interactions, which understandingly does not necessarily apply to all theoretically available moieties, some being in practice possibly hindered or superfluous. Generally, a fully cured composition displays stable physico-chemical and/or mechanical properties over time (unless failure due to aging or fatigue of the cured composition). As used herein, unless otherwise stated or clear from context, the cured compositions refer to at least partially cured compositions and to fully cured compositions.

In accordance with one aspect of the invention, there is herein disclosed a curable composition comprising:
  a) at least one reactive curable silicone pre-polymer capable of forming a silicone elastomer upon curing thereof; and
  b) a plurality of hydrophilic carbon black particles, non-covalently dispersed within said reactive curable silicone pre-polymer;
  wherein a concentration of the hydrophilic carbon black particles within the composition is at least 0.01%, by weight;
  the carbon black particles optionally having at least one of the following structural properties:
  I) a volatile matter content of at least 1.5%, by weight of the carbon black particles, and optionally of at most 50.0 wt. %;
  II) as measured in a 4 wt. % dispersion of the hydrophilic carbon black particles in aqueous methanol, a pH of at most 5.0, and optionally of at least 1.5;
  III) an oxygen content of at least 1.0% by weight of the carbon black particles, and optionally of at most 40.0 wt. %;
  IV) an acid value of the carbon black particles, in mmol/g, of at least 0.05, and optionally of at most 0.50;
  V) a surface zeta potential (at a pH of 12, and a concentration of 2 wt. % or less in distilled water) of at most −15 mV, and optionally of at least −70 mV;
  VI) containing at least one type of functional group selected from the group consisting of epoxy, hydroxy and carboxylic moieties, as detected by Fourier-transform infrared (FTIR) spectroscopy;
  VII) an $I_D/I_G$ ratio of at least 0.8, wherein $I_D$ and $I_G$ represent the peak intensity maxima of D-band and G-band, respectively, of undeconvoluted spectra as determined by Raman spectroscopy; and
  VII) an $AUC_D/AUC_G$ ratio of at least 1.2 wherein $AUC_D$ and $AUC_G$ represent the area under the curve of D-band and G-band, respectively, of deconvoluted spectra as determined by Raman spectroscopy.

In some embodiments, at least one of the silicone pre-polymers of the curable composition contains functional groups that can react with the CB particles or molecular groups thereon. For simplicity, it may also be said that the silicone elastomer contains such functional groups, which can also be referred to as carbon-black-affinic moieties. In a particular embodiment, the functional groups of the silicone pre-polymer include carbon-black-affinic moieties (e.g., amino groups), at least one silicone pre-polymer having the affinic moieties as side chains or part of its backbone. In such a case, the silicone pre-polymer including the CB affinic moieties is condensation curable. Alternatively or additionally, dispersant bearing carbon-black-affinic moieties (e.g., an amino-silicone dispersant) can be added to the composition, so as to enable or facilitate interactions between the CB particles and at least one of the reactive curable silicone pre-polymers. In such a case, the reactive curable silicone pre-polymer can be addition curable or condensation-curable.

In accordance with another embodiment of the invention, the carbon black particles being dispersed within the pre-polymer blend and the elastomer may form clusters which have a predominant particle size (applying to 90% of the particles by volume, Dv90) in the range of 100 nm to 10 μm. In some embodiments, the predominant particle size (Dv90) is at most 1000 nm, at most 700 nm, or at most 400 nm.

Silicone Elastomers

Curable silicone pre-polymers or elastomers suitable for the present teachings, include but are not limited to liquid silicone resins (LSR), room temperature vulcanization (RTV) silicones, polydialkyl siloxanes (PDAS), including for instance polydimethyl siloxanes (PDMS) silicones, which can be, if needed, further functionalized by reacting with specific reagents producing the desired reactive groups (e g, amine groups, vinyl groups, silane or silanol groups, alkoxy groups, amide groups, acrylate groups etc., and combinations thereof, as known in the art of silicones) on the silicone backbone to produce functionalized silicones. As used herein, the term "silicone(s)" (or "silicone-based" polymers and like variants) is used broadly to include such functionalized silicones, unless explicit or evident to the contrary. Some functions on a silicone pre-polymer can be cross-linkable moieties, while others may provide different desired properties to the elastomer.

The silicone pre-polymers, as described above, are hydrophobic, and form hydrophobic elastomeric surfaces. A surface is said to be hydrophobic when the angle formed by the meniscus at the liquid/air/solid interface, also termed wetting angle or contact angle, exceeds 90°, the reference liquid being distilled water at room temperature (circa 23° C.). Under such conditions, which are conventionally measured with a goniometer or a drop shape analyser, the water droplet tends to bead and does not wet the surface. Conversely, a surface is deemed hydrophilic when the contact angle is less than 90°, the water droplet readily spreading and wetting the surface.

The pre-polymers of curable silicones can be classified into addition-curable silicones and condensation-curable silicones, some chemical families enabling both curing methods.

Non-limiting examples of addition-curable or addition-cured silicones (ACS) include or result from the curing of LSR and addition-curable RTV, PDAS and PDMS silicones, whether or not further functionalized.

ACS may constitute between 40 to 95 wt. %, between 45 to 90 wt. %, between 50 to 85 wt. %, between 55 to 80 wt. %, between 65 to 80 wt. %, or between 65 to 80 wt % by weight of the total curable or cured composition. Typically, the ACS may constitute at least 60 wt. % of the total curable or cured composition.

ACS pre-polymers are cross-linked to form a matrix in the presence of cross-linkers and any such agent (e.g., a platinum catalyst) promoting the bridging of the polymers. Additionally, a retardant can be used to hinder the activity of the catalyst. Such retardants are typically of volatile nature, and once they begin to evaporate, the now unhindered catalyst can promote the addition-curing reaction. Any and all such agents (e.g., cross-linkers, curing promoters, curing inhibitors, 3D-network formers), may be referred to herein also as "addition-curing agent(s)".

Typical cross-linkers that can be used in the present invention include trimethylsiloxy terminated methylhydrosiloxane-dimethylsiloxane copolymers, CAS No. 68037-59-2 (e.g., commercially available as HMS-301 by Gelest, Inc); hydride terminated polydimethyl-siloxanes, CAS No. 70900-21-9, hydride terminated methylhydrosiloxane-dimethylsiloxane copolymers, CAS No. 69013-23-6; or trimethylsiloxy terminated polymethylhydrosiloxanes, CAS No. 63148-57-2.

In some embodiments, the concentration of the cross-linker added to the composition is within the range of 1 wt. % to 15 wt. %, 3 wt. % to 13 wt. %, 5 wt. % to 11 wt. %, 7 wt. % to 10 wt. % by weight of the total composition.

Catalysts suitable for addition-curing of silicone polymers can be a platinum divinyltetramethyl-disiloxane, CAS No. 68478-92-2, such as commercially available from Evonik® Hanse as Catalyst 510. Such catalysts are typically present in addition-curable elastomers in an amount ranging from 0.001 wt. % to 0.75 wt. %, 0.01 wt. % to 0.7 wt. %, 0.05 wt. % to 0.5 wt. %, 0.07 wt. % to 0.5 wt. % by weight of the total composition.

Suitable retardants for the addition-curing process according to embodiments of the present invention are acetylenic alcohols. Such acetylenic alcohols include, for example, 1-ethynyl-1-cyclohexanol, CAS No. 78-27-3, such as commercially available from Evonik® Hanse as Inhibitor 600, and 2-methyl-3-butyn-2-ol, CAS No. 115-19-5. In some embodiments, the concentration of the retardant added to the composition is within the range of 1 wt. % to 10 wt. %, 1 wt. % to 8 wt. %, 2 wt. % to 6 wt. %, 3 wt. % to 5 wt. % by weight of the total composition.

Suitable 3D network formers include amorphous hydrophobic fumed silica, the surface of which being at least partially covered by siloxane groups or other groups having a hydrophobic nature, such groups typically reacting with silanol functional units on the silica. These 3D network formers preferably have a refractive index within 10%, within 7%, within 5%, or within 3% of a refractive index of the elastomeric composition or of the at least one curable, hydrophobic silicone pre-polymer, after curing.

In one embodiment, the ACS is a vinyl-functionalized silicone, which may be cured in presence of at least one addition-curing agent, under any curing conditions suitable for said materials.

In some embodiments, a dispersant is added to the ACS, the dispersant being miscible with the ACS. It is believed that the dispersant can facilitate the dispersion of the carbon black particles within the curable silicone pre-polymers.

A compatible dispersant (e.g., miscible in the silicone matrix) may have a branched chemical structure and at least one carbon-black-affinic moiety having affinity to a hydrophilic surface of the hydrophilic carbon black particles. The CB-affinic moiety is selected from an amino moiety, an acrylate moiety and an epoxy moiety. The hydrophilic surface of CB generally results from oxygen-based functional groups, such as epoxy, hydroxy or carboxylic groups. A branched silicone dispersant consists of a backbone and at least one branching unit, wherein at least one of said backbone and said one or more branching units is siloxane-based, or contains at least one siloxane unit. If the branching units are only positioned at terminal ends of the backbone of the dispersant, the molecule might be considered linear. However, the term "branched molecule" is used herein to also encompass such type of substitution. Similarly, the at least one CB-affinic moiety can be disposed within the backbone or within the branching unit(s). While generally, the siloxane-based chain and the CB-affinic moieties are each disposed on separate "mono-type" components of the branched molecule (e.g., the dispersant having a siloxane-based backbone and CB-affinic moieties on branching units, or vice versa: CB-affinic moieties disposed within the backbone and siloxane-containing branching units) this "segregation" is not necessary. Suitable silicone dispersants may for example have disposed within their backbone both siloxane units and CB-affinic moieties, forming a "poly-type" backbone, the branching units stemming from any of the foregoing mono-type or poly-type backbone being also possibly a combination of siloxane-containing branching units and CB affinic branching units.

In some embodiments, the dispersant, when disposed in a synthetic isoparaffinic hydrocarbon solvent, (e.g., Isopar™ L), is a micelle-forming dispersant.

Typically, micelles formed by the micelle-forming dispersant in the synthetic isoparaffinic hydrocarbon solvent such as are inverse micelles. It is to be noted that the suitability of an amino-silicone dispersant to disperse CB particles in a silicone matrix is unexpected, in particular when the CB material is relatively hydrophilic. As a rule, dispersions of carbon black sub-micron or nanoparticles in silicones are difficult to achieve even when the particles and the silicone media have similar hydrophobicity. Such particles tend to agglomerate with one another, rather than remain homogeneously dispersed in their primary particle size or any relatively small secondary particle size that would have been achieved by a dispersing step.

Despite this, in the present invention, the dispersion of the CB particles was achieved by addition-curing of the silicones using amino-silicones as dispersants. The obtained polymeric environment, which is relatively hydrophobic/non-polar, was expected to be "adverse" to dispersions of nano or sub-micron CB particles as they are more difficult to disperse than their larger counterparts. It should be additionally noted that the use of amino-silicone dispersants is deemed counterintuitive because their amine moieties, when unbound and thus free to interact, are known to prevent or otherwise deleteriously affect addition-curing of the silicone matrix. Hence, the inventors have found a delicate balance concerning the amount of amino-silicone dispersant present during the preparation of a CB-loaded silicone matrix. On the one hand, the amount should be enough to at least partially envelop the CB particles and prevent, reduce or delay their agglomeration/aggregation; on the other hand, an excess amount should be avoided to prevent, reduce or delay any deleterious effect on addition-curing that such superfluous unbound amino-silicones may have. A suitable concentration of amino-silicone dispersant in the composition may depend, among other factors, on the type of CB particles and silicone media, as well as on the relative concentration of the carbon black in the ACS and the size of the particles Smaller particles have a relatively higher specific surface area than larger particles and may therefore require a relatively greater amount of amino-silicone dispersant to achieve desired dispersion. This concentration may be determined by routine experimentation.

Without wishing to be bound to any particular theory, the attachment of the dispersant to the carbon black particles is believed to be non-covalent. In any event, even if the dispersant were to covalently bind to the carbon black particles to some extent, the dispersant-laden particles of carbon black dispersed in a matrix as herein disclosed are not covalently bound to the silicone polymers or pre-polymers. In other words, dispersant-laden carbon black particles prepared and/or dispersed according to the present teachings may be non-covalently physically entrapped within the network of the cured silicone matrix. A person skilled in the preparation of elastomers may readily appreciate that the lack of covalent binding between particles and the surrounding polymer matrix may appreciably reduce the mechanical resistance of such elastomers as compared to a polymeric network comprising the same amount of particles covalently bound to polymers which may directly or indirectly (e.g., via coupling agents) covalently attach the particles.

The skilled artisan will further appreciate that as the amount of carbon black is increased, the relative mechanical weakness, in absence of covalent bonds between CB particles and the silicone pre-polymers or polymers, worsens. The inventors unexpectedly found that despite the mechanical weakness induced by the presence of the non-covalently bound carbon black particles, the mechanical integrity of a cured elastomeric composition according to the present teachings may be sufficiently high, even at high concentrations of carbon black particles. Concentrations of up to 45 wt. %, up to 40 wt. %, up to 35 wt. %, or up to 30 wt. % may exhibit a mechanical integrity that is sufficient for various applications.

Amino-silicones having a relatively low number of amine moieties (correlating with a low amine number) may be advantageous in achieving this balance between an amount of dispersant sufficient for the desired particle dispersion but low enough to avoid impairing curing of the matrix. Mono-amine silicones may be preferred, in particular, when the amine moiety is terminally positioned. Without wishing to be bound by any particular theory, it is believed that once attached to carbon black (e.g., via molecular groups thereon, such as polar—COOH), a terminal mono-amine is engaged in acid:base interaction, and thus unavailable to negatively affect curing of ACS. In some embodiments, the amino-silicone dispersant includes a mono-amine terminated amino-silicone.

In some embodiments, the amino-silicone dispersant has an amine number within a range of 3 and 75, 3 and 65, 3 and 55, 4 and 75, 4 and 65, 4 and 55, 4.5 and 50, 5 and 75, 5 and 65, 5 and 55, 6 and 75, 6 and 65, 6 and 55, 6.5 and 50 or 8 and 40.

In some embodiments, the amine number of the amino-silicone dispersant is at least 3, at least 4, at least 5, at least 6, at least 7, at least 8, at least 10, at least 12, at least 15, at least 20, or at least 25.

In some embodiments, the amine number of the amino-silicone dispersant is at most 150, at most 140, at most 130, at most 120, at most 110, at most 100, at most 90, at most 80, at most 70, at most 60, at most 50, at most 45, at most 40, at most 37, at most 35, at most 32, at most 30, at most 25, or at most 20.

While the amine number of amino-silicones is generally provided by the manufacturer of such materials, it can also be determined by routine analysis using standard methods. By way of non-limiting example, the amine number of a molecule harboring amine moieties can be assessed by titration of the amino-silicone with hydrochloric acid, the amine number corresponding to the milliliters of 0.1N HCl needed to neutralize 10 g of product.

In some embodiments, the amino-silicone dispersant is, includes, mainly includes, or consists essentially of an amino-silicone oil.

In some embodiments, the amino-silicone dispersant can be an aminoethyl-aminopropyl-methylsiloxane-dimethylsiloxane copolymer (CAS No. 71750-79-3), such as commercially available as GP-342 by Genesee, having a silicone backbone and CB-affinic amino moieties as branching units. Another dispersant suitable for use in the present invention can be LPX 21879 by BYK Additives & Instruments (showing an absorption band at 1446 cm$^{-1}$ in FTIR, correlating to amino groups). Yet other suitable dispersants can be selected from: silicone amines, such as Silamine® 2972 and Silamine® STD-100 (by Siltech Corporation), easy release silicones, such as Tego® RC-902, premium release silicones, such as Tego® RC-922, siloxane acrylates, such as Tegomer® V-Si 2854 (all by Evonik), aminopropyl terminated polydimethylsiloxane, such as DMS-A32, DMS-A35, and DMS-A32R (all by Gelest), aminopropyl dimethyl-polysiloxane, such as KF-8015 (by Shin-Etsu Chemical Co), amine functional silicones, such as GP-4 and GP-581 (by Genesis Polymers Corporation), Mirasil® ADM 211, (by Elkem Silicones), Skycore® SR266 and Skycore® SR220 (by Skycent Chemicals), amino siloxanes, such as Struksilon F571, Struksilon F589 and Struktol VP 5421 (by Schill+Seilacher "Struktol"), and combinations thereof.

In some embodiments, the silicone dispersant contains silicone acrylate. Such materials are conventionally used for the preparation of UV-curable silicone acrylate elastomers. For their customary use, silicone acrylates are employed in combination with photo-initiators. In the present invention, the ability of silicone acrylates to polymerize by radical-based mechanism is surprisingly harnessed to interact with the hydrophilic CB particles according to the present teachings. Compositions wherein, according to some embodiments, a silicone acrylate dispersant is used to disperse CB particles within a silicone matrix, is substantially devoid of photo-initiators. Silicone acrylates exemplify a different type of treatment of the CB particles in view of their dispersion.

In some embodiments, a concentration of acrylate within the silicone dispersant is at least 0.5%, by weight of the molecule.

In some embodiments, the concentration of acrylate with respect to the silicone dispersant molecule is within a range of 0.5% to 75%, 0.5% to 60%, 0.5% to 50%, 0.5% to 20%, 2.5% to 75%, 2.5% to 60%, 2.5% to 40%, 5% to 75%, 5% to 60% or 5% to 40%.

Silicone acrylate dispersants can be easy to controlled release or tight release free Radical Curing silicones. Such silicone acrylate dispersants are commercially available as KP-578 by Shin-Etsu Chemical Co., Tego® RC 711 (~1% acrylate) and Tego® RC 902 (~4% acrylate), both by Evonik® Industries. Namely, Tego® RC 711 and Tego® RC 902 have a silicone backbone and CB-affinic acrylate branching units, whereas KP-578 has a CB-affinic acrylic backbone and silicone branching units.

Additionally, epoxy-silicone can be used as CB dispersant within the silicone pre-polymers. Such epoxy-silicone dispersants are commercially available, for instance, as Tego® RC 1401 or Tego® RC 1403 by Evonik® Industries.

While the amount of an amino-silicone, a silicone acrylate or an epoxy-silicone dispersant in an elastomeric composition according to the present teachings may depend on a variety of factors, such as the concentration of particles to be dispersed and their size. The concentration of dispersants present in the composition is usually determined according to the concentration of the particles to be dispersed within the composition, and is optionally of at most 30%, at most 20 wt. %, at most 15 wt. % at most 12%, at most 10%, at most 8%, at most 6%, at most 5%, or at most 4% by weight of the composition. Generally, the surfactant can be present in the composition in an amount of at least 0.03%, at least 0.1%, at least 0.25%, at least 0.5%, at least 1%, at least 1.5%, at least 2%, or at least 3%, by weight of the composition. The silicone dispersant can consist of a mixture of amino-silicone dispersants, or of a mixture of silicone-acrylate dispersants, or of a mixture of epoxy-silicone dispersants, or of mixtures of any one of these dispersants with at least another. Additionally, these dispersants should be miscible with the silicone matrix, in order to obtain a uniform final cured silicone elastomer. When particular optical properties are desired, these dispersants can be selected to have a refractive index (RI) relatively similar to the RI of other constituents of the silicone matrix (e.g., within ±10% from one another).

Dispersants of other representative chemical families were tested, and were found unsuitable for the purpose of the present invention.

In some embodiments, the curable silicone pre-polymers are condensation-curable silicone pre-polymers.

Non-limiting examples of condensation-curable silicones (CCS) include condensation-curable RTV, PDAS and PDMS silicones, whether or not further functionalized. CCS pre-polymers can be cross-linked to form a matrix in absence of additional cross-linkers, such effect being provided by suitable moieties or functional groups on the silicone backbone. In some embodiments, condensation curing may further require a catalyst (e.g., a tin catalyst) and any such agent promoting the condensation of suitable moieties of the polymers, any and all such agents being termed herein "condensation curing" agent(s). In one embodiment, the CCS is a silanol-functionalized silicone, in a particular embodiment a silanol-terminated silicone. The silanol functionalized CCS may be cured in presence of at least one condensation-curing agent, under any curing conditions suitable for said materials.

In one embodiment, a dispersant is required to disperse the CB particles within the CCS, the dispersant having carbon-black-affinic moieties being as described above for ACS. In another embodiment, the CCS is a reactive amino-silicone or silicone-acrylate, so that the silicone pre-polymer already contains CB-affinic functions. In such a case, the pre-polymer may provide sufficient dispersant function per se, so that no additional dedicated dispersant is required. Still, condensation-curable pre-polymers can be used to disperse CB particles separately treated with a dedicated dispersant other than the pre-polymer. Condensation curing agents suitable for the curing of CCS elastomers are known and need not be further detailed herein.

Curing conditions for ACS and CCS are known to the skilled person and may, if needed, readily be optimized for any particular use by routine experimentation.

In embodiments where the curable composition is used to produce a layered object, such as an intermediate transfer member for indirect printing, the curable elastomeric composition of the present invention due to form a layer within such an article is preferably compatible with the composition of the adjacent layer(s). Layers' compositions are deemed compatible when the materials composing a first layer do not prevent or otherwise affect the formation or function of an adjacent second layer. By way of example, layers prepared by addition-curing are more likely to be compatible with layers prepared by the same curing method. If transfer members are to include a layer prepared by addition-curing and a neighboring layer prepared by condensation-curing, then such layers would be separated by a blocking layer preventing the mutual negative effects of one on the other.

Carbon Black

CB in its various forms is naturally hydrophobic, preferentially dispersing in nonpolar substances and with great difficulty in aqueous environments. On this account, it is conventionally preferred to use hydrophobic CB for dispersion within hydrophobic elastomeric matrices, such as formed by silicone polymers. Hydrophilic CB, which can be prepared by treatment (e.g., chemical) of the naturally occurring counterpart, is not expected to stably disperse in such hydrophobic environments, as the hydrophilic particles preferring aggregating to one another may form agglomerates which would precipitate, flocculate or otherwise separate from the matrix before it could be sufficiently cured to "freeze" a hypothetical temporarily stable dispersion. In such situations, the dispersions or the cured elastomers embedding such unstable dispersions, may be said to have "collapsed".

The Applicant believes that the present teachings surprisingly enable the dispersion of hydrophilic CB particles in hydrophobic elastomeric compositions. Hydrophilic CBs, which can readily disperse in water at concentrations of at least 5 wt. %, can be characterized by their oxygen content, resulting from the oxidizing treatment used for their manufacturing, which is deemed to correlate with the content of volatile compounds. By selecting or adjusting the content of oxygen atoms on the surface of the carbon atoms to an amount within a desired range, and/or by selecting or adjusting the content of volatile components in the carbon black to a desired range, the dispersibility of the CB and/or the stability of the dispersion may be appreciably improved. A stably dispersed hydrophilic CB may facilitate the preparation of articles including elastomeric compositions, wherein the dispersed CB may serve to provide mechanical properties, thermal conductance, electrical conductance, radiation absorption and any like properties associated with CB.

Taking as non-limiting examples, applications in the field of printing, and for instance intermediate transfer members (ITM) as used in indirect printing processes, an article comprising CB dispersed in a silicone elastomer according to the present teachings may have improved mechanical properties (e.g., resulting in a longer life span of the ITM), improved thermal conductance (e.g., facilitating heat transfer that may in turn accelerate the evaporation of liquid carriers of inks applied to the ITM), enhanced electrical conductance (e.g., expediting charging of ITM suitable for electro-printing processes) or satisfactory radiation absorbance (e.g., allowing converting radiation into sufficient energy in radiation triggered printing, such as laser printing). Well dispersed CB advantageously allows the layer/article of relevance to display substantially uniform properties as afore-exemplified over the entire surface and/or across the entire thickness of the elastomeric composition being considered In some embodiments, the volatile matter content of the carbon black is at least 1.5 wt. %, at least 2.5 wt. %, at least 3.5 wt. %, at least 5 wt. %, at least 7 wt. %, at least 8 wt. %, at least 10 wt. %, at least 12 wt. %, at least 15 wt. %, at least 18 wt. %, or at least 20 wt. %, by weight of the carbon black particles.

In some embodiments, the volatile matter content is at most 50 wt. %, at most 40 wt. %, at most 35 wt. %, at most 30 wt. %, at most 27 wt. %, at most 25 wt. %, or at most 22 wt. % by weight of the carbon black particles.

In some embodiments, the volatile matter content of the carbon black particles is within a range of 1.5 wt. % to 50 wt. %, 2.5 wt. to 50 wt. %, 3.5 wt. % to 40 wt. %, 5 wt. % to 40 wt. %, 5 wt. % to 30 wt. %, 5 wt. % to 25 wt. %, 7 wt. % to 30 wt. %, 10 wt. % to 30 wt. %, 10 wt. % to 25 wt. %, or 15 wt. % to 22 wt. % by weight of the carbon black particles.

In some embodiments, the specific volatile matter content of the hydrophilic carbon black particles, defined by a or said volatile matter content of the hydrophilic carbon black particles, in percent, as determined according to DIN 53552, divided by a BET surface area, as determined according to ASTM D6556, is at least 0.01%, at least 0.012%, at least 0.015%, at least 0.018%, at least 0.02%, at least 0.022%, at least 0.025%, at least 0.028%, at least 0.03%, at least 0.032%, at least 0.035%, or at least 0.037%.

In some embodiments, this BET-based specific volatile matter is at most 0.1%, at most 0.09%, at most 0.08%, at most 0.07%, or at most 0.06%.

In some embodiments, the specific volatile matter content of the hydrophilic carbon black particles, defined by a or said volatile matter content of the hydrophilic carbon black particles, in percent, as determined according to DIN 53552, multiplied by an average primary particle size (APPS), in nanometers, as provided by a manufacturer of said hydrophilic carbon black particles, or as determined according to dynamic light scattering (DLS), is at least 40%, at least 50%, at least 60%, at least 75%, at least 100%, at least 120%, at least 150%, at least 180%, at least 200%, at least 220%, or at least 250%.

In some embodiments, this APPS-based specific volatile matter is at most 600%, at most 500%, at most 400%, at most 350%, or at most 300%.

The term "volatile matter content", or "volatile content", relates to the amount of components that volatilize upon heating to elevated temperatures of at least 150° C., and are presented as the wt. % by weight of the CB. Generally, such values are provided by the CB manufacturers, but can be independently determined by standard methods known to the skilled chemical analyst, such as TGA or according to DIN 53552.

In some embodiments, the oxygen content of the carbon black particles is at least 1.0 wt. %, at least 1.5 wt. %, at least 2 wt. %, at least 3 wt. %, at least 4 wt. %, at least 5 wt. %, at least 6 wt. %, at least 7 wt. %, at least 8 wt. %, at least 10 wt. %, at least 12 wt. %, or at least 15 wt. %, 20 wt. % by weight of the carbon black particles In some embodiments, the oxygen content of the carbon black particles is at most 40 wt. %, at most 30 wt. %, at most 25 wt. %, at most 22 wt. %, at most 20 wt. %, at most 18 wt. %, at most 15 wt. %, or at most 13 wt. % by weight of the carbon black particles.

In some embodiments, the oxygen content of the carbon black particles is within a range of 1.0 w. % to 40 wt. %, 2 wt. % to 35 wt. %, 3 wt. % to 35 wt. %, 4 wt. % to 30 wt. %, 4 wt. % to 25 wt. %, 5 wt. % to 2 wt. 5%, 5 wt. % to 20 wt. %, 6 wt. % to 20 wt. %, 6 wt. % to 18 wt. %, 7 wt. % to 15 wt. %%, 7 wt. % to 15 wt. %, 8 wt. % to 13 wt. %, or 10 wt. % to 13 wt. % by weight of the carbon black particles.

The term "atomic %" for the surface oxygen relates to the ratio of the number of oxygen atoms (0) to the number of carbon atoms (C) as follows: (O/C)×100% existing on a surface of the carbon black particles (including at any detectable depth in an interior portion of the particle). Generally, oxygen content values are provided by the CB manufacturers, and can be converted to atomic percent by multiplying by a factor of 0.75. These values can be independently determined by known methods such as mass spectroscopy. It is to be noted that as the PPS increases, and consequently the specific surface area decreases, the atomic % will correspondingly decrease. Thus, by way of example, the surface oxygen threshold for a CB having a PPS of 50 nm may be only ⅕ the surface oxygen threshold for a CB having a PPS of 10 nm.

A CB material can be oxidatively-treated to increase the atomic % of oxygen on its surface. Examples of suitable oxidizing agents, whether gaseous or liquid, include ozone, hydrogen peroxide, nitric acids, and hypochlorous acids. The carbon black can be oxidized, for instance, with ozone or an ozone-containing gas at ambient temperature. There are also methods of wet oxidation in which the carbon black is exposed to a hypohalous acid salt, including, for instance, sodium hypochlorite and potassium hypochlorite.

By way of example, a typical preparation involves mixing the carbon black powder with hypohalous acids or salts thereof, preferably in an aqueous medium, and stirring the mixture for 1-24 hours at a temperature of room temperature to about 90° C., elevated temperatures of 50° C. or more being advantageous. The powder is then separated from the slurry, washed to remove unreacted oxidizing agent and allowed to dry. The degree of oxidation may be controlled by adjusting the concentration of the oxidizing agent, the ratio of the carbon black particles to the oxidizing agent, the oxidation temperature, the oxidation time, the stirring speed, and the like. The amount of oxygen on the CB surface (whether oxidatively-treated or not) is preferably 5 atomic % or more, 7.5 atomic % or more, or 10 atomic % or more, from the viewpoint of dispersion suitability.

Examples of a carbon black having an amount of oxygen of less than 5 atomic %, which may therefore benefit from being oxidatively-treated to be rendered suitable, include carbon black manufactured by a known method such as the contact method, furnace method, or thermal method.

Specific examples of such low surface oxygen CB include Raven® 5750, Raven® 5250, Raven® 2000, Raven® 1500, Raven® 1250, Raven® 1200, Raven® 1190 ULTRAII, Raven® 1170, Raven® 1255, Raven® 1080, Raven® 1060, and Raven® 700 (all manufactured by Columbian Chemicals Company), Regal® 400R, Regal® 330R, Regal® 660R, Mogul® L, Black Pearls® L, Monarch® 700, Monarch® 800, Monarch® 880, Monarch® 900, Monarch® 1000, Monarch® 1100, Monarch® 1300, and Monarch® 1400 (all manufactured by Cabot Corporation), Color Black FW1 (pH 3.5, BET surface area 320 m²/g), Color Black 18, Color Black S150, Color Black S160, Color Black S170, Printex® 35, Printex® U, Printex® V, Printex® 140U, Printex®

140V, NIPex® 1804Q, NIPex® 170-IQ (all manufactured by Evonik Degussa Corporation), No. 25, No. 33, No. 40, No. 45, No. 47, No. 52, No. 900, No. 2200B, No. 2300, No. 990, No. 980, No. 970, No. 960, No. 950, No. 850, MCF-88, MA600, MA 7, MA 8, and MA 100 (all manufactured by Mitsubishi Chemical Corporation).

The carbon black having an amount of surface oxygen of 5 atomic % or more may be, in addition to being prepared by oxidative treatment as mentioned, a commercially available product. Specific examples thereof include Color Black FW2 (amount of volatile material 16.5 wt. %, OAN 155 cc/100 g, pH 2.5, BET 350 m$^2$/g, PPS 13 nm), Colour Black FW 182 (amount of surface oxygen: 12 atomic %, amount of volatile material 20 wt. %, OAN 142 cc/100 g, pH 2.5, BET 550 m$^2$/g, PPS 15 nm), Colour Black FW 200 (amount of surface oxygen: 12 atomic %, amount of volatile material 20 wt. %, OAN 160 cc/100 g, pH 2.5, BET 550 m$^2$/g, PPS 13 nm), NIPex® 150 (amount of volatile material 10 wt. %, OAN 120 cc/100 g, pH 4.0, BET 175 m$^2$/g, PPS 25 nm), Special Black 4 or 4A (amount of volatile material 14 wt. %, OAN 100-115 cc/100 g, pH 3.0, BET 180 m$^2$/g, PPS 25 nm), Special Black 5 (amount of volatile material 15 wt. %, OAN 130 cc/100 g, pH 2.5, BET 240 m$^2$/g, PPS 20 nm), Special Black 6 (amount of surface oxygen: 11 atomic %, amount of volatile material 18 wt. %, OAN 170 cc/100 g, pH 2.5, BET 300 m$^2$/g, PPS 17 nm), all foregoing available from Orion Engineered Carbons Co., Ltd; Raven® 5000 Ultra II or Ultra III (amount of volatile material 10.5 wt. %, OAN 95 cc/100 g, pH 3.0-3.5, BET 583 m$^2$/g, PPS 8 nm; manufactured by Columbian Chemicals Company), and Fuji Jet Black (amount of surface oxygen: 12 atomic %; manufactured by Fuji Pigment Co., Ltd.). Information regarding different properties of these exemplary Carbon Blacks were provided by their respective manufacturers.

Additional CB particles that may be used in the method of the present invention include: Black Pearls® 800, Black Pearls® 880, Black Pearls® 2000, Black Pearls® 4350, Black Pearls® 4750, Monarch® 460, Monarch® 480, Monarch® 570, Monarch® 580, Elftex® 415, Elftex® 430, Elftex® 460, Elftex® 570, Elftex® OP, Elftex® Vulcan P, Regal® 99R and Regal® 500R (all manufactured by Cabot Corporation), Raven® 890, Raven® 890H, Raven® 1000, Raven® 1020, Raven® 1035, Raven® 1040, Raven® 1255, Raven® 3500 and Raven® 7000 (all manufactured by Columbian Chemicals Company), NIPex® 1604Q, NIPex® 35, NIPex® 70, NIPex® 90, Printex® 60-A, XPB 229 and XPB 255 (all manufactured by Orion Engineered Carbons Co.).

The level of oxidation of the CB material can be estimated by Raman spectroscopy (e.g., using LabRAM HR Evolution, Horiba Scientific). This technique allows determining the D-band and G-band peaks of the compound under study for predetermined excitation laser wavelengths (e.g., in the range of 488 nm to 647 nm), laser powers (e.g., 40 mW) and integration times (e.g., of 10 s to 120 s). Temperature can be controlled to reduce black noise (e.g., by cooling the detector). The Raman peak intensity maxima (I) or the area under the curve (AUC) can be obtained, with or without deconvolution of the spectrum by an integrated software further allowing baseline correction, if needed. It is then possible to compute the Raman peak intensity ratio of the D-band and G-band, respectively $I_D$ and $I_G$. The maximal intensity of each peak is typically measured on the undeconvoluted spectra. The spectral behavior and resulting band ratio ($I_D/I_G$) can be empirically correlated with the level of oxidation of the elemental carbon materials. A relatively low D-band to G-band ratio indicates that the CB is less oxidized than a CB having a relatively higher D-Band to G-Band ratio, all other structural properties of the CB being similar. By way of example, an $I_D/I_G$ ratio of 0.8 or more, 1.0 or more, 1.2 or more, indicates that the CB material is relatively oxidized as desired in some embodiments of the invention. Such Raman spectra can be unaffected in the bands of interest by some elastomer matrices (notably PDMS), so that the method advantageously provides a non-destructive technique to assess CB characteristics within a cured composition. The level of oxidation of carbon black particles can also be assessed by the integrated area intensity derivable from the AUC of the D-band and G-band and the ratio between the two, which can be mathematically presented by $AUC_D/AUC_G$. AUC ratios of at least 1.2, or at least 1.4, or at least 1.6 suggest a more oxidized CB.

Another way of characterizing the carbon black is by its surface zeta potential, which is the measure of the magnitude of the electrostatic or charge repulsion/attraction between particles. Its measurement provides insight into the CB's ability to disperse, aggregate or flocculate.

In some embodiments, the CB has a surface zeta potential of at most −15 mV, at most −20 mV, at most −25 mV, at most −30 mV, at most −35 mV, or at most −40 mV.

In some embodiments, the CB has a surface zeta potential within a range of −70 to −15 mV, −70 to −20 mV, −70 to −25 mV, −70 to −30 mV, −70 to −35 mV, −60 to −15 mV, −60 to −20 mV, −60 to −25 mV, or −60 to −30 mV.

Such measurements can be done in any suitable zeta potential analyzer, and were performed herein using a Zetasizer Nano by Malvern Instruments. The surface zeta potential was measured in distilled water at a pH of 12, at a concentration of 2 wt. % or less, 1 wt. % or less, or 0.1 wt. % or less of carbon black in water.

Yet another way of characterizing CB is by dibutyl phthalate (DBP) absorption. The DBP value of the CB material is not particularly limited, but is typically from about 50 mL/100 g to about 200 mL/100 g, or from 100 mL/100 g to 200 mL/100 g, or from 150 mL/100 g to 200 mL/100 g. Generally, such DBP values, or similar Oil Absorption Numbers (OAN), are provided by the CB manufacturers, but can be independently determined by methods known to the skilled chemical analyst, such as according to JIS K6621 A method or ASTM D 2414-65T.

In some embodiments, the concentration of the carbon black particles within the composition is at least 0.01%, at least 0.02%, at least 0.03%, at least 0.1%, at least 0.25%, at least 0.5%, at least 1%, at least 1.5%, at least 2%, or at least 3%, by weight of the total composition.

In some embodiments, the concentration of the carbon black particles within the composition is at most 30%, at most 20%, at most 15%, at most 12%, at most 10%, at most 8%, at most 6%, at most 5%, or at most 4%, by weight of the total composition.

In some embodiments, the concentration of the carbon black particles within the composition is within a range of 0.1% to 25%, 0.1% to 20%, 0.1% to 15%, 0.1% to 10%, 0.3% to 25%, 0.3% to 10%, 0.5% to 15%, or 0.5% to 12%, or 1% to 15%, by weight of the total composition.

In some embodiments, the weight-per-weight (w/w) ratio between the carbon black and its dispersant (e.g., aminosilicone, silicone-acrylate, epoxy-silicone etc.) is from 0.3:1 to 2:1, from 0.3:1 to 1.8:1, from 0.3:1 to 1.6:1, from 0.3:1 to 1:1, from 0.4:1 to 2:1, from 0.7:1 to 1.8:1, or from 0.9:1 to 1.6:1, or the w/w ratio between the carbon black and its dispersant is approximately 0.3:1, 0.4:1, 0.5:1, 0.6:1, 0.7:1, 0.8:1, 0.9:1, 1:1 or 1:1.5. In other words, the carbon black to dispersant w/w ratio can in some embodiments be in the range of 0.25:1 to 0.35:1, 0.35:1 to 0.45:1, 0.45:1 to 0.55:1, 0.55:1 to 0.65:1, 0.65:1 to 0.75:1, 0.75:1 to 0.85:1, 0.85:1 to 0.95:1, 0.95:1 to 1.05:1, or 1.05:1 to 1.15:1.

The pH of an aqueous dispersion of the hydrophilic CB according to the present teachings, as determined at 25° C., can preferably be in an acidic to around neutral range, for instance from pH 2.0 to pH 8.5, from pH 2.5 to pH 7.5, and advantageously, in a relatively acidic range from pH 2.0 to pH 5.5, or from pH 2.0 to pH 4.5, or from pH 2.5 to pH 4.0, or from pH 2.0 to pH 3.5. In some embodiments, the pH value of the hydrophilic CB is at most 5.0, at most 4.5, at most 4.0, at most 3.5, at most 3.0, or at most 2.7. The pH of a CB dispersion of pre-determined concentration can be measured with any suitably calibrated pH-meter equipment, for instance, according to DIN ISO 787-9. Briefly, according to this procedure a 4 wt. % CB dispersion (in 1:1 distilled water:methanol) can be stirred for 5 minutes with a magnetic stirrer at about 600-1,000 rpm, whilst the pre-calibrated pH electrode is immersed in the tested dispersion. The reading of the pH value is taken one minute after switching off the stirrer.

The acid value of the hydrophilic carbon black particles, in mmol/g, is at least 0.05, at least 0.06, at least 0.075, at least 0.1, at least 0.125, at least 0.15, or at least 0.175. In some embodiments, the acid value is at most 0.5, at most 0.4, at most 0.3, or at most 0.25. In some embodiments, the acid value is within a range of 0.05 to 0.35, 0.06 to 0.35, 0.08 to 0.35, 0.1 to 0.35, 0.05 to 0.3, 0.06 to 0.3, 0.08 to 0.3, 0.1 to 0.3, 0.05 to 0.25, 0.08 to 0.25, 0.1 to 0.25, 0.12 to 0.25, or 0.15 to 0.25. The acid value of CB can be determined by conventional methods. For instance, CB is mixed with water, and aqueous KOH is added to bring the pH to at least 11-12. The obtained slurry is then titrated with aqueous HCl, monitoring for the neutralization points of the excess base, as well as the KOH that was used to neutralize the CB-associated acid groups. The amount of HCl added between these two points represents the amount of acid on the CB.

In some embodiments, the hydrophilic carbon black particles readily form a dispersion in distilled water at a pH of 7.0, the hydrophilic carbon black particles making up 5% of said dispersion, on a weight-weight basis.

A specific surface area of the CB material is not particularly limited, but when determined by BET nitrogen absorption techniques, is preferably from 50 m$^2$/g to 650 m$^2$/g, or from 100 m$^2$/g to 550 m$^2$/g. Generally, such BET values are provided by the CB manufacturers, but can be independently determined by known methods such as according to ASTM D3037.

The substantially even dispersion/uniform behavior (e.g., mechanical reinforcement, conductance, absorbing capability, etc.) described herein-above, can be facilitated by using CB in the formed elastomer or layers thereof having a predominant particle size of less than 10 micrometers, and for some applications of less than 1 μm. Such dimensions are preferred not only with respect to primary particle size (PPS), but also for secondary particle size (SPS), which may result from agglomeration or cluster formation of such primary particles. Particles, both primary and secondary, wherein a predominant portion of the population (by volume, $D_V90$) has a particle size in the submicron range are believed to have improved size stability and dispersibility. Taking for example the case wherein CB particles are dispersed in an elastomeric composition on account of their radiation absorbing properties, and taking as illustration a situation wherein scattering should be avoided for improved behavior of the resulting article, then particles having a predominant particle size of less than half the wavelength of the emitted beam are further preferred, as scattering is accordingly reduced. Hence, in some embodiments, CB particles having a predominant particle size of less than 500 nanometers are favored.

In some embodiments, the predominant particle size ($D_V90$) is within the range of 100 nm to 10 μm, 100 nm to 1.3 μm, 120 nm to 1.3 μm, 150 nm to 1.3 μm, 200 nm to 1.3 μm, 250 nm to 1.3 μm, 300 nm to 1.3 μm, 200 nm to 1.0 μm, 250 nm to 1.0 μm, 300 nm to 1.0 μm, 350 nm to 1.0 μm, 400 nm to 1.0 μm, or 500 nm to 1.5 μm. Typically, the predominant particle size is at most 5 μm, at most 3 μm, at most 2 μm, at most 1.5 μm, at most 1.2 μm, at most 1 μm, at most 850 nm, at most 700 nm, at most 500 nm, at most 400 nm, at most 350 nm, at most 300 nm, at most 250 nm, at most 200 nm, at most 150 nm, at most 120 nm, or at most 100 nm. As explained, primary particles may aggregate to form secondary particles and a measured population may include both types of particles, their relative proportion in the population depending upon the type of the dispersion. Hence, the predominant particle size may reflect at least one of PPS and SPS.

CB particles having a predominant particle size, typically a primary particle size (PPS), of 100 nm or less are deemed in the nano-range, primary particles having an average particle size (APPS) of 80 nm or less, 60 nm or less, 40 nm or less, or 30 nm or less, being particularly preferred for close particle packing. Generally, the CB primary particles have an average PPS ($D_V50$) of 5 nm or more, or 10 nm or more, or 15 nm or more, and typically in the range of 8 to 80 nm, 8 to 65 nm, 8 to 55 nm, 10 to 80 nm, 10 to 65 nm, or 10 to 55 nm. The size of the particles, predominantly of the primary particles, may affect their ability to closely pack within the elastomer, relatively small particles being capable of higher packing density than their relatively larger counterparts. Advantageously, a lower amount of relatively small particles may achieve a similar CB density as a higher amount of relatively large particles. Depending on their size, and additionally among other things on the viscosity of the elastomer, the conditions and duration of curing, the thickness of the elastomer layer being cured and such manufacturing factors known to the skilled person, the particles may segregate and form a gradient-like distribution across the layer thickness. Larger CB secondary particles may tend to more rapidly settle and accumulate towards the bottom of the layer, while relatively smaller particles may follow such a trend, if at all, at a slower pace, hence remaining in relatively higher concentration in the upper section of the layer. In this context, "bottom" and "top" sections of the layer relate to their orientation during curing, and not necessarily when installed and in operation of the article of relevance (e.g., as a cyclically moving ITM in a printing system). Such a segregation of the particles forming inner strata of particle distribution along the depth of the elastomeric article, (e.g., across the imaging surface of an ITM) may be advantageous if a sufficient thickness of the upper section becomes substantially devoid of CB particles. In the exemplary case of an intermediate transfer member, this "top stratum" can serve as a release surface, the absence of particles increasing its smoothness and therefore believed to improve the quality of the ink image that may be transferred therefrom.

Manufacturers generally provide the average primary particle size of the CB material, as assessed for instance according to ASTM D 3849. Particle size distribution, whether assessed by dynamic light scattering (DLS) or microscopic techniques, may provide information on the primary particle size (PPS) of the material and on its secondary particle size (SPS), i.e. the size of assembly of primary particles forming for instance agglomerates or clusters. The PPS value typically remains constant during the preparation of the compositions, the steps believed to rarely break down primary particles to sub-primary size. However, the SPS values change according to the particular methods used for the preparation of the curable composition and for the preparation of the cured ones.

As CB can be provided as close-pack or loose-pack clusters, loose-pack types can be preferred to facilitate dispersion.

In DLS techniques, the particles are approximated to spheres of equivalent behavior and the size can be provided in terms of hydrodynamic diameter. DLS facilitates assessing the size distribution of a population. As used herein, particles having a size of, for instance, 1 μm or less, have at least one dimension in X-Y-Z coordinates equal to or smaller than 1 μm, and possibly two or even three, depending on shape. When the particles are approximately spherical, a size of 1 μm or less, is to be understood as an average diameter equal to or smaller than 1 μm.

Though not essential, the CB particles may preferably be uniformly shaped and/or within a symmetrical distribution relative to a median value of the population and/or within a relatively narrow size distribution.

A particle size distribution (PSD) is said to be relatively narrow if at least one of the two following conditions applies:

A) the difference between the hydrodynamic diameter of 90% of the particles and the hydrodynamic diameter of 10% of the particles is equal to or less than 150 nm, or equal to or less than 100 nm, or equal to or less than 50 nm, which can be mathematically expressed by: (D90−D10)≤150 nm and so on; and/or B) the ratio between a) the difference between the hydrodynamic diameter of 90% of the particles and the hydrodynamic diameter of 10% of the particles; and b) the hydrodynamic diameter of 50% of the particles, is no more than 2.0, or no more than 1.5, or no more than 1.0, which can be mathematically expressed by: (D90−D10)/D50≤2.0 and so on.

D10, D50 and D90 can be assessed by number of particles in the population, in which case they may be provided as $D_N10$, $D_N50$ and $D_N90$, or by volume of particles, in which case they may be provided as $D_r10$, $D_r50$ and $D_r90$. The foregoing measurements can be obtained by DLS techniques when the samples to be studied are suitably fluid or by microscopy when the particles under study are in dry form or embedded in a cured composition.

As used herein, D50, which can also be termed the "average measured particle size" or simply the "average particle size" may refer, depending on the measuring method most suited to the particles being considered and their media, either to $D_r50$ (by DLS and the like) or to the volume average size of 50% of the particles found in a field of view of a microscope adapted to analyze in the scale of the particles. Similarly, D90, which can also be termed the "predominant particle size", may refer either to $D_r90$ or to the volume average size of 90% of the particles found in a microscope field of view.

The CB particles may have any suitable aspect ratio, i.e., a dimensionless ratio between the smallest dimension of the particle and the longest dimension in the largest plane orthogonal to the smallest dimension. In some embodiments, the carbon black primary particles are approximately spherical and can have an aspect ratio in the range of 0.2:1 to 1:5, or 0.5:1 to 1:2. Secondary particles of CB which may agglomerate therefrom are not necessarily spherical, still their aspect ratio can be in the range of 0.1:1 to 1:10, 0.2:1 to 1:5, or 0.5:1 to 1:2.

Though not essential, the carbon black primary particles may preferably be uniformly shaped and/or within a symmetrical distribution relative to a median value of the population. In some embodiments, the carbon black secondary particles are within a relatively narrow particle size distribution, such narrow PSD being advantageously maintained in the cured silicone elastomer.

In a preferred embodiment of the invention, the CB particles and silicone-based materials (e.g., the curable pre-polymers, the amino-silicone, silicone-acrylate or epoxy-silicone dispersants) are compatible. As appreciated by a person skilled in the art of elastomer formulation, a "compatible" set of materials for any particular composition or formulation means that the presence of any such compatible compound does not negatively affect the efficacy of any other compound for any step of preparation or in the final composition. Compatibility can be chemical, physical or both. For instance, a dispersant suitable to disperse carbon black into a curable silicone fluid would be compatible both with the carbon black material and with the silicone polymers to be cured (as well as with any other agent required to perfect such curing; all collectively generally termed the "silicone media"). For instance, the dispersant would not be compatible if, among other things, preventing, reducing or retarding the curing of the silicone pre-polymers, not being miscible with the pre-polymers or being deleterious to the carbon black, and any like undesired effects. In some embodiments, compatibility may additionally mean that the materials deemed compatible share a common property, such as a common silicon-based chemistry or a similar physical parameter. For instance, materials having a similar refractive index (RI; within ±10% from one another) are believed to yield clearer cured films, as compared to materials having relatively dissimilar RI that may appear more turbid.

In some embodiments, the cured composition can be characterized by any one of the following parameters. One such parameter is the presence and/or quantity of products resulting from the carbon-black-affinic moieties of the dispersant or of some particular CCS polymers. For example, amine and/or amide in the final product may suggest the use of an amino-silicone dispersant in the manufacturing process. Amides can form in the curing process, hinting to their origin from amino-silicones. Acrylate-moieties and epoxy-moieties can be similarly detected to suggest the use of corresponding dispersants. This can be done by conventional means such as FTIR. While peaks indicative of particular chemical groups do not necessarily mean that a corresponding dispersant was used, such results can be highly suggestive, in particular in combination with other characteristics of a cured product prepared according to the present teachings.

Additionally, traces of a platinum catalyst, added to enhance the addition-curing, or tin catalyst added to enhance the condensation-curing, can indicate which curing mechanism was used to obtain the final product. Such platinum or tin traces can be detected by trace analysis of platinum or tin by known analytical methods, e.g., by Inductively Coupled Plasma Spectroscopy (ICP), Gas Chromatography—Mass Spectrometry (GCMS), Elemental Analysis and Energy Dispersive Spectroscopy (EDS). In the case of addition-curing, such traces of the platinum catalyst can also originate from the additional amount of the catalyst added to counteract with the excess amines that may result from the use of an amino-silicone dispersant.

Preparation of Elastomeric Compositions Comprising Carbon Black in Silicone Media While in the description provided below, several processing methods are disclosed to disperse CB particles into the silicone media, these are not meant to be limiting. Suitable equipment may include an ultrasonic disperser, a high shear homogenizer, a sonicator, a sand mill, an attritor media grinding mill, a pearl mill, a super mill, a ball mill, an impeller, a dispenser, a horizontal agitator KD mill, a colloid mill, a dynatron, a three-roll mill, an extruder and a press kneader, to name a few.

The curable compositions that may be obtained by any suitable process, as exemplified below, can then be deposited upon a substrate to form, following curing, the desired article. The composition may be deposited on the substrate by any suitable process, such as pouring, casting, web-coating, roll-coating, draw-down coating, spray coating, spin coating, flow coating, dipping, spraying, molding, extrusion molding, laminating, or the like.

Any substrate adapted to the intended article may be used, such as metals, plastics, and woven or non-woven fabrics. Suitable substrates may further have any suitable dimension, shape, surface topology, and any other such desirable property which needs not be further detailed for the understanding of the present invention. In some embodiments, the substrate may be an integral part of the intended article, to which the deposited composition would remain attached following curing. Alternatively, the substrate and the deposited composition can be releasibly in contact with one another during the curing process, then separated from one another (e.g., peeled away) following curing.

Following, casting of the curable composition upon a suitable substrate, including when applicable by pouring the composition into a mold, levelling can optionally be performed or allowed to proceed, so as to obtain any desired predetermined thickness. The substrate-deposited curable composition may then be cured over a time period of from about 0.5 to about 24 hours, such as from about 0.5 to about 12 hours, or from about 1 to about 4 hours. The curable composition may be cured at an appropriate temperature, such as from about 90° C. to about 200° C., or from about 90° C. to about 180° C., or from about 120° C. to about 140° C. If condensation curing is considered, then curing can additionally be performed under controlled humidity, at a relative humidity (RH) of from about 20% to about 80%, or from about 30% to about 70%, or from about 30% to about 60%.

In accordance with a further aspect of the invention, there is herein disclosed a cured composition, obtained following curing the curable compositions described above. In some embodiments, the cured composition is an addition-cured composition obtained by addition-curing of an addition-curable composition.

In accordance with yet a further aspect of the invention, there is herein disclosed a method of preparing a cured composition, the method comprising a first step of preparing the curable composition, followed by curing of said composition. The method may further comprise additional steps, including for instance the casting of the curable composition upon or within a curing support, ahead of the curing step, and the separation of the cured composition from the curing support, following the curing step.

The curable composition can be prepared according to the following method:
a) size-reducing initial hydrophilic carbon black lumps in a presence of a first hydrophobic silicone dispersant, to obtain an initial dispersed mixture containing size-reduced carbon black particles;
b) mixing the initial dispersed mixture with a hydrophobic curable silicone pre-polymer, to produce a final dispersed mixture, the size-reduced carbon black particles within said final dispersed mixture having a $D_v90$ in the range of 100 nm to 10 μm, said mixing being optionally in presence of curing agents;
c) curing the final dispersed mixture to produce the elastomeric composition containing the dispersed carbon black particles.

Optionally, the curable silicone pre-polymer is mixed with the CB-dispersant mixture in a number of sub-steps. For instance, silicone pre-polymer(s) can be added in a first sub-step; and cross-linking agents; curing facilitators; curing retardants; 3D-network former or any like material necessary for the preparation of a curable composition when admixed with the silicone pre-polymers can be added in any number of subsequent sub-steps. Typically, the curing agents are jointly added in a second sub-step.

Further optionally, a second silicone dispersant can be added to the curable silicone pre-polymer to produce an intermediate elastomeric mixture before mixing step b). The first dispersant used in step a) to size-reduce the CB particles and the second dispersant optionally used in step b) wherein the curable silicone pre-polymer is supplied as an intermediate elastomeric mixture can be the same or different. In the event a same dispersant is used, at the different steps or sub-steps of addition, the terms first dispersant, second dispersant, and so on, can be referred to as a first part, a second part and so on, of the dispersant.

Prior to curing, the curable composition (the final dispersed mixture including the CB particles and the silicone media) can be applied on a surface so as to form a layer of desired (pre-determined) thickness, or within a mold so as to form an object substantially having a shape conforming to the mold.

It is believed that the addition of a second dispersant or of a second part of the silicone dispersant prior to step b) reduces desorption of the silicone dispersant from the carbon particles surface towards the curable silicone pre-polymer, which diffusion, if overly extensive, could cause undesired agglomeration/aggregation/flocculation of the carbon black particles.

In some embodiments, the method comprises, prior to curing, a dilution step, wherein the mixture is further diluted with an additional amount of a curable silicone pre-polymer or mixture of silicones, and/or with volatile organic solvents. Such solvents, when compatible with the intended silicone fluid, may facilitate some stages of the layer preparation or application to recipient layers or supports, as well as prevent destabilization or flocculation. A relatively high volatility being advantageous in reducing or eliminating the presence of these solvents in a final article. Therefore, as used herein the term "volatile solvent", and like variants, refer to a solvent capable of evaporating under the curing conditions of the method, so as to be substantially absent from the cured product.

As mentioned, a volatile solvent is suitable if compatible with the other constituents of the curable composition. Suitably, the volatile organic solvent is xylene, a synthetic isoparaffinic hydrocarbon solvent commercially known as Isopar™ L, M or G, an organosilicone solvent such as hexamethyldisiloxane and hydrocarbon solvents such as hexane. In some embodiments, the volatile organic solvent is xylene. Typically, the CB dispersed silicone is diluted with the volatile organic solvent at a weight per weight ratio of at least 1:4, or 1:9.

In some embodiments, curing (e.g., addition-curing) is carried out using a catalyst, a retardant and a cross-linker such as the ones previously described.

While partial curing of the silicone matrix may proceed at 120° C. (taking about 0.5-1 hour, depending on layer thickness), such step can be accelerated by raising the temperature (e.g., reducing curing duration to about 20 minutes if cured at 140° C.).

The reaction progress can be followed by a number of means, such as swelling, wherein the cured or partially cured elastomer is placed in a solvent, and as a result, absorbs a portion of the solvent and subsequently swells. The reaction is completed once a steady state is reached, and no more swelling is observed. Other ways of confirming reaction completion are by analyzing the mechanical properties of the cured elastomer such as by measuring the Tg (e.g., by DSC) as well as tensile strength and surface hardness throughout the progression of the curing.

The methods for preparing the compositions according to the present teachings are schematically depicted in FIG. 1, which shows a simplified diagram of the different steps that may be employed for preparing a curable composition and for preparing a cured composition according to various embodiments of the invention. As detailed below, some steps can be combined, skipped, and/or be effected in an order different than in the illustration.

In a first step S101, a stock of hydrophilic CB particles having PPS and SPS as provided by the supplier (i.e., stock baseline values $PPS_1$ and $SPS_1$) is dispersed, so as to reduce the size of the secondary particles that may be present in the stock from $SPS_1$ to first dispersion value of $SPS_2$, wherein $SPS_2 < SPS_1$. Preferably, following such dispersion, $SPS_2$ can be in the sub-micron range, but this need not necessarily be the case, as additional steps of the method or operative conditions of any single step may further reduce the size of the secondary particles to $SPS_3$, $SPS_4$, and so on. The preliminary dispersion of the stock CB lumps into smaller clusters of particles can be performed in dry form (e.g., on particles as supplied), or in wet form (e.g., on particles found in a liquid medium). If dry CB is desired, it may be dried in an oven until the water content is reduced below 5%. The changes in water content can monitored by TGA measurements during the drying procedure.

In some embodiments, such a first step S101 is performed in presence of a dispersant (in which case the size of the secondary particles of CB upon completion of the step shall be defined as $SPS_3$). It is believed that all other parameters (e.g., dispersing conditions and duration) being similar, $SPS_3 \leq SPS_2 < SPS_1$. When dispersants are in liquid form, the CB particles are typically gradually added thereto, the mixing conditions being optionally modified and adapted according to the relative amounts of CB and dispersant. The mixing of the two can be done by any suitable method, known to the skilled persons, under conditions preserving the functionality of the constituents. For instance, if the silicone dispersant or the carbon black are compatible with one another by means of chemical moieties attached thereto (e.g., carbon-black-affinic moieties and oxygen-based moieties), then the mixing conditions should not significantly affect such moieties. By way of example, if a dispersant is adapted to disperse a CB stock by way of amine moieties that may be heat sensitive, then the mixing should preferably be performed at a temperature maintaining the functionality of such groups (e.g., at less than 70° C., preferably at no more than 50° C.). As a rule, such processes are performed at least at room temperature (circa 23° C.), in particular when considering addition-curing, a process that may be hampered by water condensation in the vessels being used.

Upon completion of S101, the CB particles having reached any desirable $SPS_2$ or $SPS_3$ dimension, the silicone pre-polymer. This is illustrated in FIG. 1 by step S102 wherein silicone pre-polymers can be added to the product of step S101. The materials are mixed to homogeneity by any suitable method. The size of the secondary particles of CB upon completion of this step shall be defined as $SPS_4$, which can be smaller than $SPS_2$ or $SPS_3$. The agents that may control the curing timeline can then be added in a subsequent step S103. In some embodiments, the curing agent(s) of step S103 further comprises additional constituents of the curable composition, for instance a dispersant, or a silicone pre-polymer. In one embodiment, the silicone media is a two-component silicone, the mixing of which providing a curable composition. In such a case, the CB particles can be mixed in a first part of the two-component silicone, the curing agent(s) of step S103 being supplied by a second part of the two-component elastomeric matrix.

If necessary, the products of step S102 or step S103 can be diluted ahead of curing to facilitate their casting. If a dilution step S104 is employed for the preparation of a curable composition, the curing agents of step S103 can alternatively be added after the dilution of the product of step S102. The dilution can be done with any suitable volatile solvent by any appropriate method. In any event, following the addition of curing agents and mixing therewith of the product comprising the CB particles, the resulting mixture constitutes a curable composition.

The curable composition prepared according to any of the embodiments as herein described can then be extruded, deposited onto a casting surface or into a casting mold during a casting step S105.

While extrusion of a curable composition can be performed under conditions that may concomitantly cure the composition, the curing step S106 is typically considered distinct. Curing can be performed in any suitable equipment under any appropriate conditions (e.g., temperature, duration, relative humidity, etc.) adapted to cure the curable composition. Curing needs not be performed under constant conditions.

While not illustrated in the figure, following curing, the cured composition can be, if desired, separated from its casting surface or casting mold. The cured product can also be further modified to obtain an intended end-product.

EXAMPLES

Example 1: Dispersion of Carbon Black Particles with an Amino-Silicone Dispersant in Addition-Curable Silicone Elastomers (PDMS)

Grinding and Compounding Step

Carbon Black nano-powder (Colour Black FW 182, Orion Engineered Carbons, CAS No. 1333-86-4, 20 wt. % volatile matter, pH 2.5, 550 m²/g BET Surface, PPS 15 nm, OAN 142 ml/100 g) was dried for at least two hours at 120° C. in a ventilated oven (UT 12 P, Thermo Scientific Heraeus® Heating and Drying Ovens).

375 g (37.5% by weight of the final paste composition) of an amino-silicone dispersant, a functional pendant amine/dimethyl silicone copolymer having a kinematic viscosity at 25° C. of about 3700 mm²/s and an amine number of 8 (GP-342, Genesee Polymers Corporation), were poured into a spinning tree-roll mill grinding machine (Model JRS230, manufactured by Changzhou Longxin Machinery Co. Ltd.).

250 g (25 wt. % of the final paste composition) of the dried CB powder were slowly added to the silicone fluid and co-milled at room temperature (RT circa 23° C.) and at a speed gradually decreasing from about 800 rpm to about 100 rpm, as the viscosity of the paste increased. Lowering of the speed allowed maintaining a relatively constant compounding temperature, so as to preserve the chemical stability/integrity of the constituents. The added CB consisted at the beginning of the process of agglomerates having a size of above 5 µm or even greater than 10 µm, as estimated by conventional microscope techniques. The CB-dispersant mixture was milled until the CB powder was sufficiently size-reduced to be homogeneously dispersed in the silicone fluid and a black, high viscosity mass was obtained. Typically, such a mass of dispersant-treated size-reduced CB was obtained within about one hour. The size of the CB particles at this stage was not directly assessed, the measurements deemed more relevant being later performed on the final composition once cured, as shall be detailed below.

A mixture (9:1 ratio by weight, respectively) of a vinyl functional polydimethyl siloxane (PDMS) containing both terminal and pendant vinyl groups (Polymer XP RV 5000, Evonik® Hanse, CAS No. 68083-18-1) and an amino-silicone dispersant (GP-342, as used for the previous compounding with CB) was separately prepared with a high-shear homogenizer. The mixture was homogenized (using a T 50 digital Ultra-Turrax® equipped with R50 stirring shaft, IKA®-Werke GmbH) for about twenty minutes at a controlled temperature circa RT and at a high-shear speed of 10,000 rpm.

375 g (37.5 wt. % of the final paste composition) of the addition-curable mixture comprising the vinyl functional PDMS and the amino-silicone dispersant prepared as aforesaid, were added in a step-wise manner to the previously described black mass of CB-dispersant. The addition was performed under continuous milling at the same conditions, 100 rpm and RT, until the black mass turned into a high-viscosity, shiny black paste (typically within 1 hour of adding the silicone elastomer), the resulting paste having a high concentration of carbon black (at this stage 25 wt. %) dispersed in the silicone polymer. This CB paste was further diluted prior to casting to achieve a workable viscosity.

Dilution Step

I) Preparation of a Silicone Diluting Premix:

The following addition-curable silicone pre-polymers were mixed using the previously described high-shear homogenizer at 10,000 rpm for about twenty minutes, at a controlled temperature circa RT.

a vinyl-terminated polydimethylsiloxane 5000 cSt (DMS-V35, Gelest, CAS No. 68083-19-2) at about 50 wt. % of the silicone premix;

a vinyl functional polydimethylsiloxane containing both terminal and pendant vinyl groups (Polymer XP RV 5000, Evonik® Hanse, CAS No. 68083-18-1) at about 21.4 wt. % of the silicone premix; and a branched structure vinyl functional polydimethylsiloxane (VQM Resin-146, Gelest®, CAS No. 68584-83-8) at about 28.6 wt. % of the silicone premix.

II) Combining the Diluting Premix with the CB Paste Mixture:

An additional amount of the amino-silicone dispersant GP-342 was added to the silicone premix, so that their respective concentrations were 8 wt. % and 72 wt. % of the diluted composition, which further comprised 20 wt. % of the final CB paste, containing the CB particles, treated with the amino-silicone dispersant and dispersed in the vinyl functional PDMS elastomer. The CB concentration in the diluted mixture was thus reduced to 5 wt. % of the final composition. The diluted mixture was high-shear homogenized at 10,000 rpm as previously described for approximately two hours until the diluted black PDMS silicone mixture was homogeneous (e.g., no black chunks or aggregates were observed). The resulting diluted mixture of CB in a blend of PDMS silicones typically displayed a workable viscosity adapted for convenient casting.

Curing Step

The diluted mixture of CB amino-silicone-dispersed in the PDMS silicones blend described above was rendered curable, ahead of its casting, by mixing thereof with:

About 0.1 wt. % of a platinum catalyst, platinum divinyltetramethyl-disiloxane complex (SIP 6831.2, Gelest®, CAS No. 68478-92-2);

About 3.7 wt. % of a curing retardant, Inhibitor 600 of Evonik® Hanse; and

About 8.7 wt. % of a reactive cross-linker, methylhydrosiloxane-dimethylsiloxane copolymer (HMS 301, Gelest®, CAS No. 68037-59-2).

A sheet of transparent polyethylene terephthalate (PET, 100 & 150 micrometer thickness from Jolybar Ltd.) was pre-treated by corona to further the adherence, to its surface, of the curable composition including the CB particles. The corona treatment included an exposure of about 20 minutes to UV-irradiation (UltraViolet Ozone Cleaning System T10X10/OES/E, supplied by UVOCS® Inc.). Alternatively, a PET pre-treated for enhanced adhesion of silicone coatings (Hostaphan® 3 SAB, by Mitsubishi Polyester Film Inc.) was used.

The curable composition comprising the carbon black particles amino-silicone-dispersed into the polydimethyl siloxane mixture was applied on the pre-treated PET support by Mayer rod, so as to form a wet layer of no more than 10 µm thickness. The coated layer was partially cured for two hours at 70° C. in a ventilated oven, then temperature was raised to 120-140° C. for one hour to achieve a full cure of the silicone elastomer and stable bonding of the layer to the PET support.

The dispersion of the CB particles in the cured layer was studied. The CB primary particles formed agglomerates and the average size (e.g., diameter) of such CB secondary particles clusters was of about 200-400 nanometers, as estimated by image analysis of the cured layer at a ×100 magnification under light microscope (Olympus® BX61 U-LH100-3). The light microscope analysis supported the even distribution of the clusters across the silicone matrix. Trained observers estimated that smaller clusters of 100-200 nm were also present in the matrix, though below formal level of detection. A top view picture was captured by scanning electron microscope (SEM; FEI Magellan™ 400 operated in tunneling mode) and at least 10 particles deemed by a trained operator to represent the majority of the CB population, such particles forming a representative set, were measured. The dimensions of isolated particles forming the clusters were found to be in agreement with PPS as provided by the manufacturer, and the cluster sizes was as preliminarily assessed under light microscope, confirming the presence of clusters as small as 100 nm. The particles looked well-dispersed in a manner similar to exemplified in FIGS.

2A-2B, which differ by the silicone matrix within which that CB particles were dispersed.

Optical properties of the samples are detailed in Table 2 of Example 8.

The skilled person can readily appreciate that in the above-described exemplary formulation including carbon black particles dispersed in a PDMS silicone matrix with an amino silicone dispersant, the dispersant-laden carbon black particles are not covalently bound to the matrix. Unbound carbon black particles may leach out from a cured material swelled in a swelling solvent (e.g., toluene) if exposed for sufficient time and temperature (e.g., 12 hrs at 60° C.) to allow release of the particles from physical entrapment.

Example 2: Dispersion of Carbon Black Particles in Various Concentrations with an Amino-Silicone Dispersant in Addition-Curable Silicone Elastomers (LSR)

While the afore-mentioned method of preparing a curable silicone composition containing CB particles was substantially devoid of added volatile organic solvents, the following alternative procedure makes use of such liquids. Such solvents, when compatible with the intended silicone fluid, may facilitate some stages of the composition preparation or of its casting or application to a substrate, a relatively high volatility being advantageous in reducing or eliminating the presence of these solvents in a final article. A solvent is deemed sufficiently volatile if capable of fully evaporating, or substantially so, during curing.

Milling and Compounding Step 50 g of CB (Colour Black FW 182), previously dried for at least 1.5 hours at 150° C., having a $D_V 10$ of about 2.9 µm, a $D_V 50$ of about 4.5 µm, and a $D_V 90$ of about 6.1 µm, as measured by DLS (Malvern Zetasizer Nano S) were mixed with 50 g of amino-silicone dispersant (BYK LPX 21879, BYK Additives & Instruments, having an amine number of 36) in 200 g of xylene AR (having a boiling point of about 138.4° C., CAS No. 1330-20-7, Bio-Lab Ltd).

The milling was carried out in an attritor bead mill (Attritor HD-01, Union Process®) with stainless steel beads of about 4.76 mm (SS 302 3/16 inch beads, Glen Mills Inc.), at 700 rpm. The temperature was controlled using a double jacket tank-refrigerated circulated water bath WBL-200 to remain at approximately 25° C. The milling was performed for about 1.5-3 hours.

The size distribution of the CB particles so milled was then assessed by the above described DLS method and the CB particles co-milled with the dispersant were found to be predominantly in the nano-range (having a $D_V 10$ of about 43 nm, a $D_V 50$ of about 67 nm, and a $D_V 90$ of about 139 nm).

The CB dispersion was added to Silopren® LSR 2540, so that the CB particles constituted 20 wt. % of the total LSR matrix. The LSR matrix was prepared by mixing an equal weight of part A and part B of the intended LSR elastomer (the two-component addition-curable liquid silicone rubber being manufactured by Momentive Performance Materials Inc). All constituents were placed in a planetary mixer (ARE-250 Thinky) and mixed for 3 min at 2,000 rpm and allowed to defoam under the same centrifugal conditions for another 3 min. The 20 wt. % CB dispersed in LSR was further diluted with an according weight of LSR to reach a CB concentration per weight of the final matrix (i.e. excluding the volatile solvent) of about 7.5 wt. %, 10 wt. % and 15 wt. %, and mixed for 3-5 min at 2,000 rpm.

Dilution Step

Each of the four samples of LSR silicone fluid containing the different concentrations of dispersed CB particles was diluted at a weight per weight ratio of 1:30 in xylene (Chemically Pure grade) using a high shear mixer (Bio-Gen Series PRO-200 Pro Scientific) for 1 min at 8,000-10,000 rpm. The resulting diluted mixture of CB particles dispersed in LSR silicones typically displayed a workable viscosity adapted for convenient casting.

Curing Step 3 ml of each sample of the xylene diluted CB-LSR dispersions prepared as aforesaid was applied upon a 5×5 cm area of a corona pre-treated PVC sheet placed on a hotplate, and heated to 40° C. Application was performed by spray coating, using an air brush at a pressure of 2 bar (under dry nitrogen). The resulting layer of curable CB-LSR composition, having a wet thickness between about 1 µm and 5 µm, was allowed to fixate to the support while being maintained on the 40° C. hotplate for about 5 to 10 minutes, during which time the organic solvent evaporated. Then, the samples were transferred to a ventilated oven and allowed to partially cure for 15 minutes at 100° C.

A bottom-less circular mold of 3 cm in diameter and 2 mm height was then placed on top of each one of the partially cured samples of CB dispersed in LSR coating the PVC sheets. In order to provide mechanical support and enable the PVC separation from the thin LSR layer, 1 ml of transparent two-component silicone (QSil 213, commercially available from Quantum Silicones) was delicately poured into the molds using a syringe and air bubbles were removed. The additional layer of silicone was selected to be transparent for the sake of the absorbance measurements to be further detailed below. The molded silicone discs were then gradually heated from 40° C. to 60° C. for 2 hours using a hotplate, until cured sufficiently for mechanical integrity. The partially cured samples were removed from the PVC sheets support and further cured at 150° C. in a ventilated oven for 1 hour. Finally, 2.5 cm circles of each one of the samples were cut-out using a punch tool within an area constrained by the molds, yielding the fully cured samples for the present study.

Figure 2A:
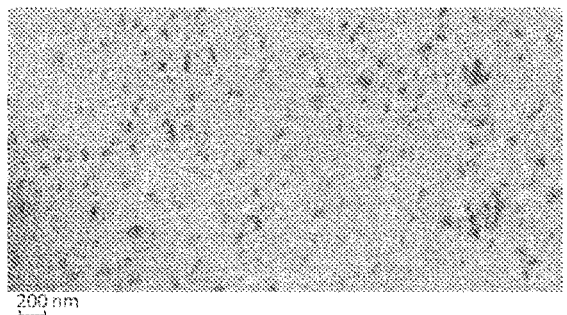
FIGS. 2A-2H display pictures of various samples of elastomeric matrix embedding CB particles, as recorded by FIB-SEM microscope, and their schematic illustration.
Figure 2B:
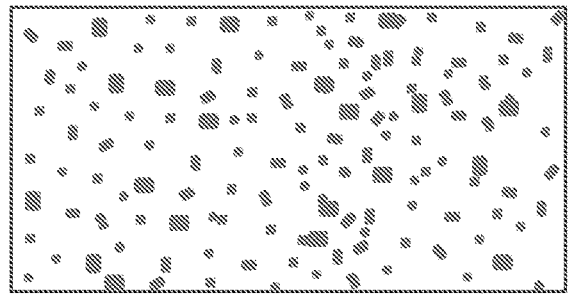

The dispersion of the CB particles was analyzed by FIB-SEM microscope (ZEISS Gemini Crossbeam 340). A cross-section image of a sample of 10 wt. % CB particles dispersed in LSR according to the present teaching is presented in FIG. 2A and a schematic illustration thereof is depicted in FIG. 2B. The milled particles appear to be well-dispersed within the silicone matrix.

Figure 2C:
Figure 2D:
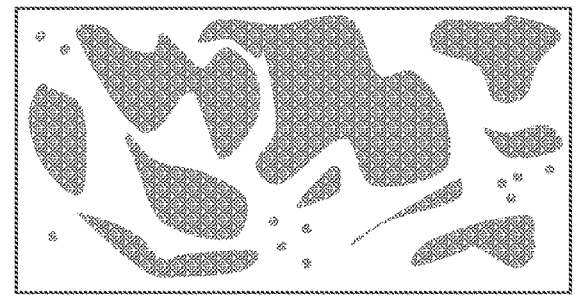

For comparison, the above compounding procedure was repeated without first milling the CB particles and the dispersant, instead the two were directly added as supplied by their respective manufacturer to the LSR. This reference sample, referred to herein as the "unmilled" control, contained 7.5 wt. % of the same CB as used above (namely, Colour Black FW 182). A cross-section FIB-SEM image of the "unmilled" CB particles dispersed in LSR is presented in FIG. 2C and a schematic illustration thereof is depicted in FIG. 2D. The particles appear to be agglomerated in large clusters within the silicone matrix.

Figure 2E:
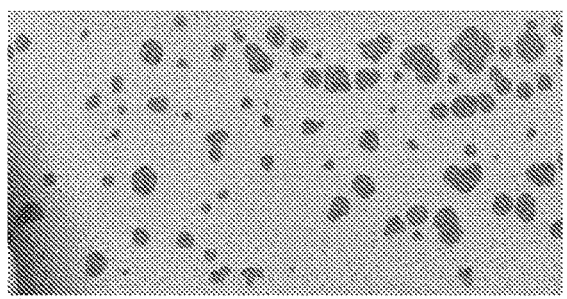
Figure 2F:
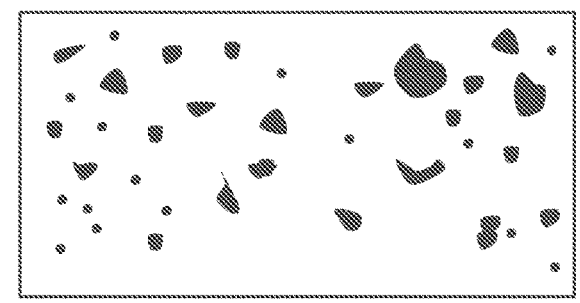

Yet another comparative sample was prepared by adding to the LSR matrix, CB provided by a different manufacturer (Akrosperse® 20-MI-002, Akrochem Corporation, having a $D_V 50$ of 775 nm, as measured by DLS in xylene). The CB is provided already dispersed by the supplier in a silicone fluid at a pigment loading of 66 wt. %. The pre-dispersed CB was added to the LSR in absence of any further dispersant or milling step. This comparative sample, containing 20 wt. % of CB used as commercially supplied, is referred to herein as the "commercial" control. A cross-section FIB-SEM image of the "commercial" CB particles dispersed in LSR is presented in FIG. 2E and a schematic illustration thereof is depicted in FIG. 2F. Again, in absence of treatment of the CB particles according to the invention, the particles appear as agglomerates of large bulks, not evenly dispersed.

A last comparative sample was prepared by mixing Colour Black FW 182 with the amino-silicone dispersant, adding them at a CB concentration of 5 wt. % in an addition-curable elastomer matrix intentionally cured under unfavorable prolonged conditions. Under such circumstances, the particles are expected to collapse if the dispersion of the particles destabilizes before curing proceeds to achieve sufficient cross-linking density. The elastomer matrix was a mixture of vinyl functional PDMS silicone polymers as follows: 44.6 wt. % of DMS-V35, 25.5 wt. % of VQM 146 and 19.1 wt. % of XP RV 5000, combined with 0.064 wt. % of a platinum catalyst (SIP 6831.2), 7.6 wt. % of a cross-linker (HMS 301) and 3.2 wt. % of a curing retardant (Inhibitor 600). In this control process, following the casting on pre-treated PVC of this mixture of CB in addition-curable PDMS, the comparative sample was incubated at RT overnight. As ambient temperature delayed or reduced partial curing, the relatively low viscosity of the matrix allowed the dispersion of CB particles to participate in Brownian motion for a prolonged period of time (as compared to samples being cast at 40° C. and/or readily incubated at elevated temperatures of at least 70° C.) permitting the destabilization of the dispersion. Following this long first step, the samples were transferred to a ventilated oven and allowed to partially cure for 15 minutes at 100° C., then subjected to the same procedure as previously detailed.

Figure 2G:
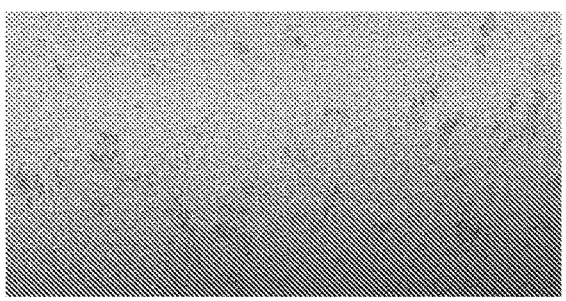
Figure 2H:
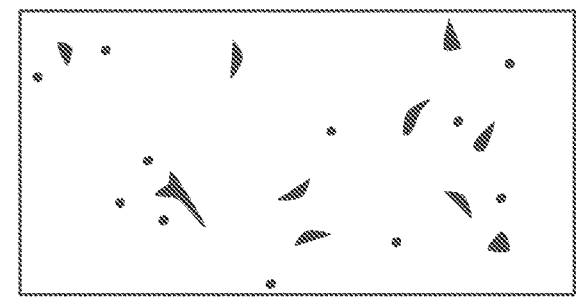

A cross-section FIB-SEM image of the obtained "unstable" layer is presented in FIG. 2G. A schematic illustration of such "unstable" CB dispersion is depicted in FIG. 2H. The particles appear to agglomerate and do not evenly disperse. While the present "unstable" control was achieved by intentionally delaying curing of the matrix, it is believed that additional mechanisms of destabilization of the CB particles within the silicone matrix would yield similar outcomes of a majority of particles "collapsing" out of the dispersion, a minority of particles possibly remaining dispersed depending on the exact reason for the lack of proper dispersibility.

Spectral and Absorption Analysis

Spectral and absorption analysis were performed using a UV-VIS NIR spectrophotometer (Carry 5000 Agilent) equipped with Universal Measurement. Accessory (UMA) in an integrated sphere. Each sample was placed so that its normal would be at an angle of 10° with respect to the incident light, with detectors placed at angles of 20° and 180 with respect to the incident light, measuring the reflected and the transmitted light, respectively. The True Absorbance of the cured samples was calculated as follows:

$$\text{True Absorbance} = \ln\left(\frac{100 - \text{Reflection}}{\text{Transmission}}\right)$$

The thickness of the cured layer was measured using a handheld micrometer (Insize® code no. 1112-150) and the True Absorbance measurements were divided by the measured thickness of each test sample to yield normalized values of True Absorbance (in arbitrary units) per micrometer of sample thickness.

Figure 3A:
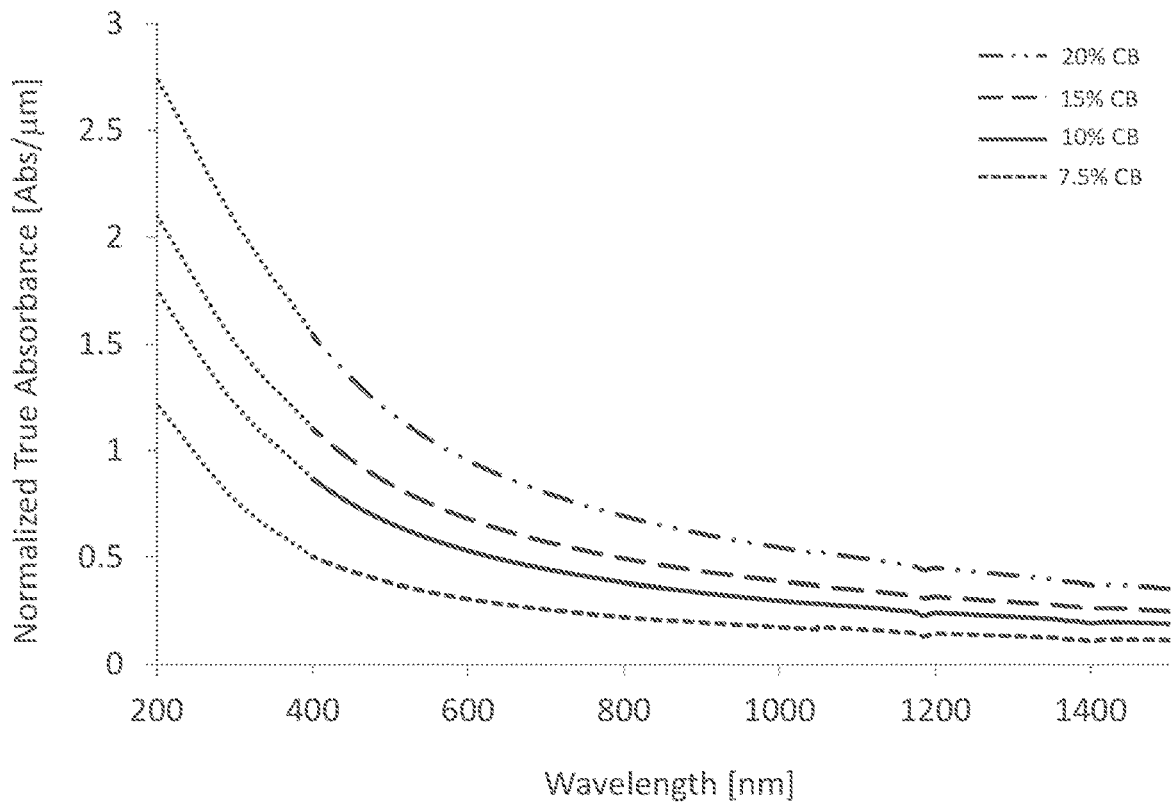
FIG. 3A shows a plot of absorbance per micron thickness of the elastomeric sample (Normalized True Absorbance or NTA) as a function of wavelength, as measured in the UV-VIS-NIR range of 400-1500 nm, and further extrapolated to 200 nm, as recorded for silicone samples comprising various weight concentrations of CB particles prepared according to particular embodiments of the invention.

Normalized True Absorbance (NTA) measurements were calculated for the samples of silicone elastomers containing CB particles dispersed according to the present teachings. The values displayed by the matrices containing 7.5-20 wt. % of milled CB as a function of wavelength over a spectrum ranging from 400 nm to 1500 nm are plotted in FIG. 3A. As can be seen in the figure, there is a correlation between the Normalized True Absorbance of the sample and the concentration of CB particles dispersed therein; higher CB concentrations yield higher Normalized True Absorbance. Curves as shown in FIG. 3A may assist selecting the desired concentration of CB particles, given a wavelength of interest (or range thereof) and a sought level of absorbance. They may also guide the manufacturer of such elestomeric compositions comprising well-dispersed particles or nanoparticles as to the thickness of relevance to any particular level of absorbance at the wavelengths of interest.

Additionally, an extrapolation of the NTA curves measured over the 400-1500 nm range was performed for wavelengths in the 200-400 nm middle and near UV range of the spectrum. Such extrapolated curves are represented by dotted lines in the figure. The NTA values of the tested samples as measured at 400 nm, 500 nm, 700 nm, 900 nm and 1100 nm, and extrapolated to 200 nm, are reported in Table 1.

TABLE 1

| Sample | NTA @ 200 nm (extrapolated) | NTA @ 400 nm | NTA @ 500 nm | NTA @ 700 nm | NTA @ 900 nm | NTA @ 1100 nm |
|---|---|---|---|---|---|---|
| 5 wt. % CB in LSR | NA | 0.276 | 0.210 | 0.142 | 0.109 | 0.089 |
| 7.5 wt. % CB in LSR | 1.220 | 0.501 | 0.379 | 0.256 | 0.193 | 0.163 |
| 10 wt. % CB in LSR | 1.750 | 0.868 | 0.658 | 0.443 | 0.333 | 0.268 |
| 15 wt. % CB in LSR | 2.100 | 1.102 | 0.841 | 0.571 | 0.433 | 0.346 |
| 20 wt. % CB in LSR | 2.750 | 1.549 | 1.178 | 0.802 | 0.608 | 0.496 |

As an absorbance of 1.0 AU means that 90% of the light emitted at any particular wavelength has been absorbed, and an absorbance of 2.0 AU indicates that 99% of the light is absorbed, it can be seen from the above-table that samples having a thickness as low as 1 micrometer (as per the normalization of the measured results) can absorb, if comprising 10 wt. % CB or more, almost substantially all of the UV light in the range of up to 400 nm. Such potency can be harnessed, for instance, for the preparation of UV filters made of thin silicone films.

Figure 3B:
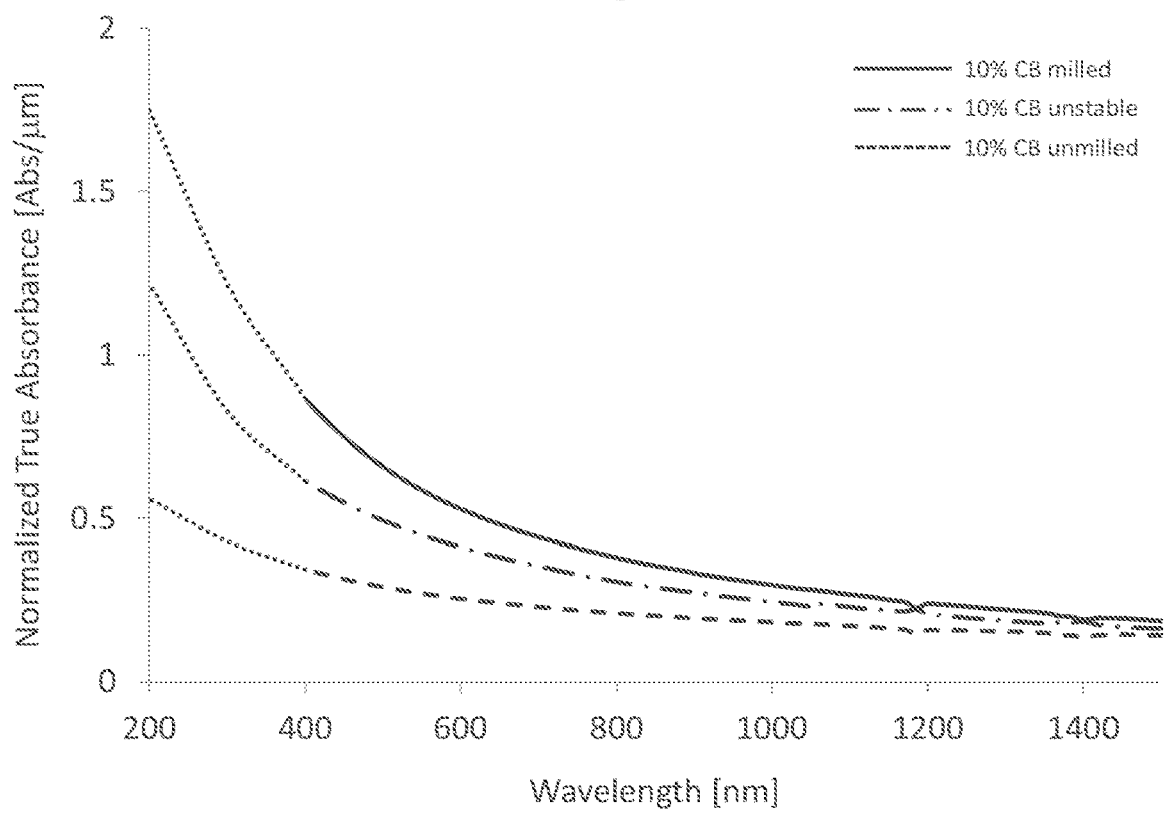
FIG. 3B shows a plot of NTA as a function of wavelength in the UV-VIS-NIR range of 400-1500 nm, and further extrapolated to 200 nm, as recorded for silicone samples comprising 10 wt. % of CB either dispersed according to the present invention ("milled"), or blended in a similar matrix ("unmilled"), or having collapsed out of the elastomer ("unstable")

FIG. 3B illustrates how the quality of the dispersion of the CB particles affect the Normalized Absorbance of the samples. All samples plotted on this figure contained 10 wt. % of CB, the continuous line representing a "milled" sample prepared according to the invention, the dashed line representing an "unmilled" control, similarly prepared but lacking the initial milling of carbon black and dispersant, and the dotted line representing an "unstable" collapsed dispersion. As can be seen, the "milled" sample of well-dispersed CB (as schematically illustrated in FIG. 2B) yielded the highest Normalized Absorbance, as compared to the "unstable" sample (schematically illustrated in FIG. 2H) wherein milled CB is not well dispersed, and "unmilled" sample (schematically illustrated in FIG. 2D) wherein the CB particles are blended with their dispersant in the silicone matrix in absence of a preliminary milling.

Therefore, if a particular level of absorbance within a range of wavelength of interest is desired for a particular application, the invention allows to use a lower concentration of better dispersed carbon black particles to achieve an absorption similar to higher concentrations of particles in undispersed or unevenly dispersed comparative samples. The ability to reduce the amount of CB to achieve a particular technical goal, illustrated in the example by light absorbance, can have numerous beneficial implications, beyond cost reduction, as readily appreciated by the skilled person.

Example 3: Dispersion of Carbon Black Particles with an Amino-Silicone Dispersant in Addition-Curable Silicone Elastomers (LSR)

Milling and Compounding Step 50 g of CB particles (Colour Black FW 182) and 50 g of amino-silicone dispersant (BYK LPX 21879) were co-milled in an attritor bead mill as described in Example 2 with a modification concerning the controlled temperature at which such step was performed, namely at about 50° C. The size distribution of the CB particles so milled was then assessed by DLS on a sample comprising about 0.1 wt. % of CB and found to be predominantly in the nano-range (having a $D_V10$ of about 48 nm, a $D_V50$ of about 74 nm, and a $D_V90$ of about 139 nm).

The CB dispersion was added at a concentration per weight of the final matrix (i.e. excluding the volatile solvent) of about 2.4 wt. %, 4.5 wt. %, 6.5 wt. %, 8.3 wt. %, 11.5 wt. % and 14.3 wt. %. The according weight of CB dispersions (i.e. about 6 g, 12 g and so on) was added to 20 g of Silopren® LSR 2540 (Part A), gently hand mixed, then poured into 20 g of Silopren® LSR 2540 (Part B). It is noted that adding the CB materials to a pre-mix of Part A and Part B of the LSR was also found to be satisfactory. The resulting CB silicone fluid was further mixed in a planetary centrifugal mixer as described in Example 2, and similarly allowed to defoam.

A small amount of the samples was applied on a microscope glass. The pattern of dispersion of the CB particles in the uncured silicone matrix was assessed by light microscopy as previously detailed and found stable over the period of casting of the LSR components.

Dilution Step

The LSR silicone fluid containing the CB dispersed particles was diluted at a weight per weight ratio of 1:9 in xylene to facilitate casting. The CB particles in the diluted silicone matrix appeared to remain stably dispersed, without flocking, and moving individually within the matrix, as assessed by light microscopy.

Curing Step

The xylene diluted CB-LSR dispersion was applied to a smooth releasable corona pre-treated PET support maintained on a hot plate at 40° C. by spray coating using an air pressure brush. The resulting layer of curable CB-LSR composition, having a wet thickness of between about 1 μm and 5 μm, was allowed to fixate the support, which was then transferred to partially cure in an oven, as described in Example 2. A two-component clear liquid silicone (QSil 213) was then cast on top of the partially cured layer of silicone comprising the CB particles. The resulting PET-supported layers were further partially cured at about 100° C. for approximately 1-2 hours in a ventilated oven. The PET support was then peeled away to yield a two layered sheet of silicone, which was subsequently cured at about 150° C. for 2-3 hours.

The absorbance of the cured samples and their thickness was assessed, as described in more details in Example 8 and confirmed the impact of CB particles concentration on the Normalized Absorbance of these samples over the 400-1500 nm range. The results are displayed in Table 2 of Example 8. It is to be noted that while the additional layer of silicone was added to the film of silicone embedding the CB particles dispersed according to the present teachings to provide transparent mechanical support, this study further confirms the ability of compositions of the disclosure to be further attached or incorporated into more complex articles.

Example 4: Dispersion of Carbon Black Particles with a Silicone-Acrylate Dispersant in Addition-Curable Silicone Elastomers (PDMS)

While in Example 1, the dispersant used for co-milling with the dried CB particles (Colour Black FW 182) was an amino-silicone dispersant, in the present example, acrylate-silicone dispersants were used. The silicone acrylate dispersants (KP-578 supplied by Shin-Etsu Chemical Co., Tego® RC 711 (~1% acrylate) and Tego® RC 902 (~4% acrylate), supplied by Evonik® Industries) were formulated in the CB-PDMS matrix as detailed in Example 1 for the amino-silicone dispersant, with minor modifications, such as the amount of the carbon black particles being of only 3 wt. % in the final elastomeric composition, instead of previously described 5 wt. %.

All samples satisfactorily cured under similar curing conditions and displayed stable dispersions as assessed by microscope analysis.

Example 5: Dispersion of Carbon Black Particles with an Amino-Silicone Dispersant in Condensation-Curable Silicone Elastomers (PDMS)

Milling and Compounding Step 50 g of CB (Colour Black FW 182), previously dried for at least two hours at 120° C., were mixed with 50 g of amino-silicone dispersant (BYK LPX 21879) in 100 g of hexamethyldisiloxane (HMDSO; having a boiling point of about 101° C., CAS No. 107-46-0, Sigma-Aldrich Co. Ltd.). HMDSO was used as a volatile liquid diluent, in a manner similar to xylene in previous examples. The dispersion was carried out for 4 hours in an attritor bead mill, with stainless steel beads of about 4.76 mm, at 700 rpm under controlled temperature circa RT (as previously described).

The size distribution was then assessed by DLS on a sample comprising about 0.1 wt. % of CB and the CB particles co-milled with the dispersant were found to be mainly in the nano-range (having a $D_V10$ of about 52 nm, a $D_V50$ of about 91 nm, and a $D_V90$ of about 211 nm).

Diluting Step

The CB dispersion was then added to a silanol-terminated polydimethyl-siloxane fluid (DMS S-27, 700-800 mm²/s, Gelest®) to achieve CB concentrations per weight of the final matrix of about 5.5 wt. %, 12.5 wt. % and 21.4 wt. %. The according weight of CB dispersions (i.e. 40 g, 80 g and 120 g) was added to respective amounts of 160 g, 120 g and 80 gr of silanol-terminated condensation-curable PDMS. The resulting CB silicone fluid was mixed for about ninety minutes in the attritor under the same conditions (700 rpm and 20° C.) resulting in a black mass of condensation-curable PDMS.

Curing Step 1 g of cross-linker (ethylpolysilicate PSI023, Gelest® or ethylsilicate 48, Colcoat) and 0.05 g of tin catalyst (dioctyl tin bis(acetylacetonate) Tin Kat® 223, CAS No. 54068-28-9, TIB) were added to 9 g of CB-dispersed in the condensation-curable silicone. The curable mixture was degassed and applied to a desired support. Prior to the application of the degassed mixture, a transparent PET was corona-pretreated with ozone and coated with a priming layer (SS4120, Momentive) to facilitate attachment. The condensation-curable silicone layer was applied by a rod wire at predetermined thicknesses of up to about 40 µm (including layers of 5 µm and 20 µm) and allowed to partially cure at ambient conditions (circa 23° C. and 30-60% RH) for about 12-24 hrs. The partly cured structure was then transferred to an oven for 2 hrs at 120-140° C. at about 30% RH), for curing finalization. The pattern of dispersion of the CB particles in the condensation-cured silicone matrix was assessed by light microscopy as previously detailed and found stable, well-dispersed and without particles flocking.

Example 6: Control Example, Commercial Carbon Black, No Added Dispersant

A commercially available concentrated CB paste, wherein CB is pre-dispersed in a silicone fluid (Akrosperse® 20-MI-005, 50 wt. % CB, Akrochem Corporation), was compounded with condensation-curable PDMS (DMS S-27), following by the curing procedure as described in Example 5, in respective amounts yielding a 5 wt. % final CB concentration. However, the commercial CB paste, used as supplied, was mixed without addition of any further dispersant of any type. The mixture of the CB paste and the PDMS matrix was dispersed using the spinning tree-roll mill under conditions similar to those previously applied to the CB particles co-milled with the amino-silicone or silicone-acrylate dispersants according to the present teachings. The blend of commercial CB in PDMS was diluted and cured as previously detailed and the cured samples were studied under light microscope. The control sample prepared by this process displayed relatively large CB aggregates (~0.5-1.5 µm, as microscopically assessed), which were at least twofold larger than the secondary particles formed using the present formulations and methods.

Without wishing to be bound by any particular theory, it is believed that the conventional formulations lack CB particles having suitable properties, and/or appropriate amounts and/or suitable agents able to prevent the reagglomeration of primary particles that may be transiently obtained during any step of the procedure.

Example 7: Comparative Example, Polyglycerin-Modified Silicone Dispersant

An addition-curable CB silicone composition was prepared as described in Example 1, modified for comparison by replacing the amino-silicone dispersant by a surfactant of a different chemical family. The non-amino-silicone dispersant was selected for its expected suitability with Carbon Black. Namely, a polyglycerin-modified silicone, KF-6106, supplied by Shin-Etsu Chemical Co. was tested in same concentrations as the amino-silicone dispersant of Example 1. This conventional non-amino-silicone dispersant failed to satisfactorily disperse the CB particles of the present formulation, thus resulting in the flocking and agglomeration of the particles in the cured product.

Example 8: Optical Measurements

Some optical properties of the cured layers comprising dispersed CB particles prepared by the methods described in the previous examples were assessed. Unless otherwise stated, the sample of interest was cast on a smooth clean support, such as a glass slide, leveled by rod coating to a known thickness and cured (e.g., 1-2 hrs at 120-140° C.), the cured layer having generally a thickness of at least 2 µm, as established by confocal microscopy.

The cured layer was gently separated from its casting support and placed in a film holder suitable for subsequent measurements. The optical absorbance of such samples was measured with a spectrophotometer over a range of at least 300 nm to 1200 nm (Cary 5000, UV-Vis-NIR spectrophotometer from Agilent Technologies). The drop in absorbance between the two sides of the film was normalized to the thickness of the tested samples and the Normalized Measured Absorbance (NMA) of such layers per micrometer of thickness (AU/µm) was calculated. Representative results of NMA at selected wavelengths, for silicone layers including CB particles dispersed with amino-silicone dispersants, are presented in Table 2 provided below, in which the values reported for the matrices loaded with carbon black relate to the effect of the sole CB particles (the baseline values of the respective matrices being subtracted). All results are reported in Arbitrary Unit per micrometer.

TABLE 2

| No. | Sample | NMA @ 300 nm | NMA @ 500 nm | NMA @ 700 nm | NMA @ 900 nm | NMA @ 1100 nm |
|---|---|---|---|---|---|---|
| 1 | 2.5 wt. % CB in PDMS (Ex. 1) | 0.293 | 0.093 | 0.069 | 0.056 | 0.048 |
| 2 | 5.0 wt. % CB in PDMS (Ex. 1) | 0.479 | 0.188 | 0.138 | 0.109 | 0.091 |
| 3 | 7.5 wt. % CB in PDMS (Ex. 1) | 0.692 | 0.291 | 0.204 | 0.158 | 0.129 |
| 4 | 2.4 wt. % CB in LSR (Ex. 3) | 0.067 | 0.041 | 0.029 | 0.021 | 0.018 |
| 5 | 4.5 wt. % CB in LSR (Ex. 3) | 0.196 | 0.106 | 0.074 | 0.056 | 0.047 |
| 6 | 6.5 wt. % CB in LSR (Ex. 3) | 0.439 | 0.224 | 0.156 | 0.117 | 0.096 |
| 7 | 8.3 wt. % CB in LSR (Ex. 3) | 0.651 | 0.326 | 0.222 | 0.165 | 0.133 |
| 8 | 11.5 wt. % CB in LSR (Ex. 3) | 0.681 | 0.379 | 0.261 | 0.195 | 0.159 |

TABLE 2-continued

| No. | Sample | NMA @ 300 nm | NMA @ 500 nm | NMA @ 700 nm | NMA @ 900 nm | NMA @ 1100 nm |
|---|---|---|---|---|---|---|
| 9 | 14.3 wt. % CB in LSR (Ex. 3) | 0.733 | 0.413 | 0.285 | 0.214 | 0.172 |
| 10 | 5.5 wt. % CB in S27 (Ex. 5) | 0.549 | 0.226 | 0.167 | 0.135 | 0.114 |
| 11 | 12.5 wt. % CB in S27 (Ex. 5) | 0.577 | 0.271 | 0.214 | 0.172 | 0.147 |
| 12 | Ref: 0 wt. % CB in LSR | 0.00103 | 0.00149 | 0.00137 | 0.00150 | 0.000135 |
| 13 | Control: 10 wt. % CCB in PDMS | 0.290 | 0.102 | 0.090 | 0.087 | 0.085 |

As can be seen in the above table, CB particles dispersed according to the various methods herein disclosed provided comparable absorbing properties per micrometer thickness of layer, such normalized absorbance generally decreasing as the wavelengths increased. In the above, the methods of preparation and resulting layers were exemplified with three types of silicone polymers, two types of curing method and two types of amino-silicone dispersants, as specified below:
  Items 1-3 for addition curing of ACS PDMS (prepared according to Example 1)
  Items 4-9 for addition curing of ACS LSR (prepared according to Example 3)
  Items 10-11 for condensation curing of CCS PDMS (prepared according to Example 5) These examples also represent different types of interactions between the silicone dispersants and the CB particles Amino-silicone dispersants are expected to form acid-base relationship or amine-epoxy interactions. Silicone acrylate dispersants are believed to form dipole:dipole interactions For comparison, similar silicone matrices prepared in absence of CB particles according to the present teachings displayed an insignificant to null baseline absorbance, of about 0.001 Abs/μm or less, over the same range of wavelengths, see item 12 for LSR matrix, the PDMS matrices behaving similarly whether cured by addition-curing or by condensation-curing.

The impact of the CB nanoparticles dispersed according to present teachings can be seen from the positive correlation between the wt. concentration of CB particles in the silicone matrix and the absorbing capacity of the layer over the tested range. Based on the present set of results peak or plateau of absorbance for each particular formulation are expected at carbon loading of at least 10 wt. %, at least 15 wt. % or possibly at carbon loading of more than 20 wt. %. Such CB concentration dependent patterns can readily be established by the skilled person, whom can elect desired CB loading as per peak of optimal activity and/or intended use. For all practical purposes, it is believed that carbon black presence in curable or cured silicone compositions needs not to exceed 30 wt. %, being often of no more than 25 wt. %.

In a control experiment, see item 13, a comparative layer was prepared in which the same carbon black material was milled and incorporated in a PDMS matrix similarly to items 1-3, the method however lacking any amino-silicone dispersant. In the resulting layer, the CB particles were therefore of a more conventional size, in the range of 0.5-1.5 μm. This conventional CB (CCB) material was embedded in the PDMS matrix at a relatively high concentration of 10 wt. %. Despite such high load, the CCB control provided a poorer absorption relatively to lower concentrations of CB particles prepared according to some embodiments of the invention. In this experiment, the 10 wt. % CCB in PDMS (item 13) was found comparable to the 2.5 wt. % CB in PDMS (item 1). Therefore, the present methods and formulations are approximately 4-fold superior, with respect to the amount of CB particles providing similar absorbance, due to the effect of the dispersant.

Example 9: Analysis of CB Oxidation Level by Raman Spectroscopy

A comparative analysis of CB particles having different levels of oxidation was performed using Raman spectroscopy (LabRAM HR Evolution, Horiba—Jobin Yvon Technology). A sample of Colour Black FW 182 (~20 wt. % volatile matter), used in the previous examples were placed on an adhesive tape on a microscope slide. A comparative sample deemed to have a lower level of oxidation, namely Mogul® L (Cabot, 4.5 wt. % volatile matter) was similarly prepared.

Figure 4A:
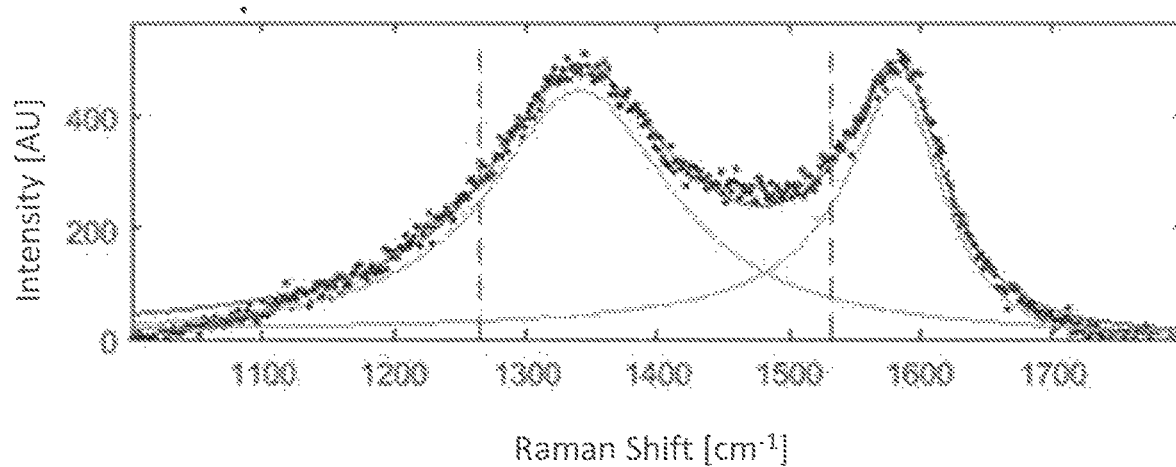
FIG. 4A shows a Raman spectrum of a higher-oxidation level carbon black sample (Colour Black FW 182)
Figure 4B:
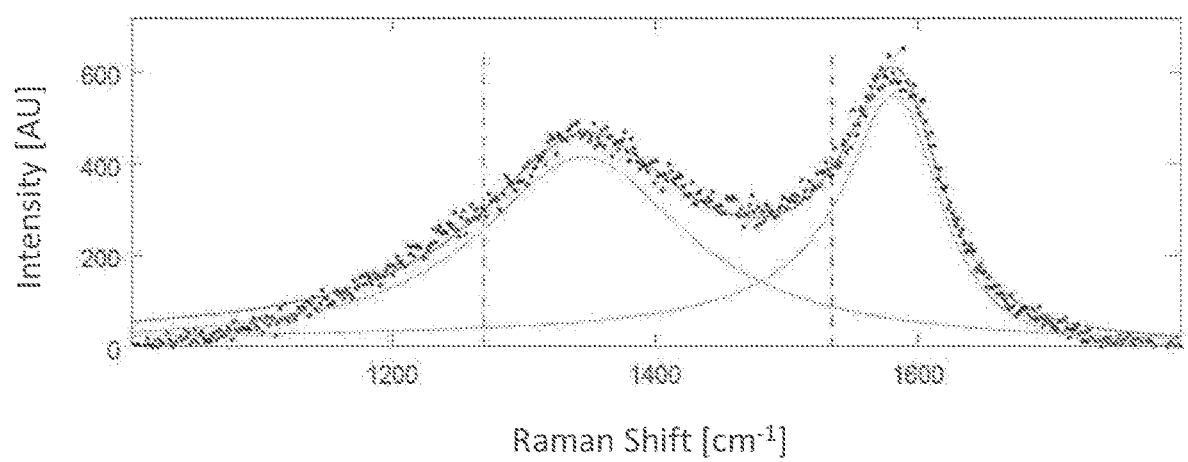
FIG. 4B shows a Raman spectrum of a lower-oxidation level carbon black sample (Mogul® K).

Both samples were analyzed by Raman spectroscopy. The spectrum obtained by analyzing the Colour Black FW 182 sample is shown in FIG. 4A, the relatively more oxidized sample displaying a D-band (445.2 AU at 1341 cm$^{-1}$ Raman Shift) and a G-band (448 AU at 1588 cm$^{-1}$ Raman Shift) of similar intensities at peak maxima, and having an $I_D/I_G$ ratio of 0.99. The spectrum obtained by analyzing the Mogul® L sample is shown in FIG. 4B, the relatively less oxidized sample displaying a D-band maximal peak intensity (414.5 AU at 1345 cm$^{-1}$ Raman Shift) that is lower than the G-band maximal peak intensity (551 AU at 1588 cm$^{-1}$ Raman Shift), and having an $I_D/I_G$ ratio of 0.75.

As can be seen, measurements of maximal peak intensities and calculation of $I_D/I_G$ ratio as obtained by Raman spectroscopy, allow to assess the level of oxidation of samples containing carbon black particles.

Example 10: Dispersion of Carbon Black Particles with an Amino-Silicone Dispersant in Addition-Curable Silicone Elastomers Milling and Compounding Step 30 g of Mogul® L CB, provided as supplied, were mixed with 30 g of amino-silicone dispersant having a kinematic viscosity of 5,000-15,000 mm$^2$/s and an amine number of 12.1 (Skycore® SR220, Skycent Chemicals) and 540 g silicone liquid (Octamethyltrisiloxane, M3, having a boiling point of about 152.3° C., CAS No. 107-51-7, Gelest®).

The mixture was then milled using an attritor bead mill (Attritor HD-01, Union Process®) with stainless steel beads of about 2 mm (AISI 52100 chrome steel beads RHC 60-67 Glen Mills Inc.), at 3,500 rpm. The temperature was controlled using a double jacket tank-refrigerated circulated water bath WBL-200 to remain at approximately 25° C. The milling was performed for about 3 hours, to yield a CB paste.

The size distribution of the CB particles so milled was then assessed by the above described DLS method and the CB particles co-milled with the dispersant were found to be predominantly in the sub-micronic range (having a $D_V10$ of about 101 nm, a $D_V50$ of about 183 nm, and a $D_V90$ of about 288 nm).

The CB concentration in the CB paste was measured by weighing a sample of the paste in an aluminum dish and comparing it to the weight of the same sample following evaporation of the liquid from the paste by heating the sample in an oven at 80° C. for 30 minutes. The CB concentration was found to be 9.6 wt. % by weight of the CB paste.

Preparation of a Silicone Matrix

The following addition-curable silicone pre-polymers were mixed by hand:
  a vinyl-terminated polydimethylsiloxane 500 cSt (DMS-V25, Gelest, CAS No. 68083-19-2) at about 8.8 wt. % of the silicone premix;
  (25-35% methylhydrosiloxane)-dimethylsiloxane copolymer, trimethylsiloxane terminated, 25-35 cSt (HMS-301, Gelest, CAS No. 68037-59-2) at about 0.3 wt. % of the silicone premix;
  M3 at about 90.9 wt. % of the silicone premix.

Combining the CB Paste with the Silicone Matrix 5 g of the silicone matrix prepared above and an additional amount of 0.2 g of M3 were placed in a 20 ml glass vial, and 4.8 g of the CB paste were added. The mixture was agitated by a Vortex Genie 2 mixer (from Scientific Industries Inc.) for at least 30 seconds, and then sonicated twice for 4 seconds at 20% or maximal amplitude of a Vibra-Cell™ sonicator (Sonics & Materials, Inc.), with a 1 second pause between sonications, whereby a homogeneous CB dispersion was obtained, as confirmed by optical microscopy at a magnification of ×100 (using a cover slide and immersion oil).

Curing Step

20 μg of a platinum catalyst, platinum-cyclovinylmethylsiloxane complex (SIP 6832.2, Gelest®, CAS No. 68585-32-0) were diluted with 1 g of M3, and the obtained diluted catalyst was added to 3 g of the CB dispersion obtained in the previous step. The mixture was agitated in a vortex for 20 seconds, filtered using a 1 μm GF filter (no. 729228, Macherey-Nagel), and was applied immediately on a PET support by a smooth rod, so as to form a wet layer of no more than 75 μm thickness. The coated layer was maintained for 15 minutes at room temperature to evaporate the M3 in the composition, followed by casting, using a square mold, of a layer of LSR (SL9508AB, KCC Corporation) of 1 mm thickness on top of the CB-silicone layer previously applied, and partial curing at a temperature of 80° C. in a ventilated oven for 30-45 minutes. The partially cured adjacent layers of CB-containing silicone and LSR were then separated from the PET sheet and placed on an aluminum tray in the ventilated oven for post-curing at 150° C. for 60 minutes.

The CB elastomer was analyzed by light microscopy, and the CB particles therein were found to be well-dispersed, and substantially devoid of agglomerates. Similar results were observed in FIB-SEM microscope analysis.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the present disclosure has been described with respect to various specific embodiments presented thereof for the sake of illustration only, such specifically disclosed embodiments should not be considered limiting. Many other alternatives, modifications and variations of such embodiments will occur to those skilled in the art based upon Applicant's disclosure herein. Accordingly, it is intended to embrace all such alternatives, modifications and variations and to be bound only by the spirit and scope of the disclosure and any change which come within their meaning and range of equivalency.

In the description and claims of the present disclosure, each of the verbs, "comprise" "include" and "have", and conjugates thereof, are used to indicate that the object or objects of the verb are not necessarily a complete listing of features, members, components, elements, steps or parts of the subject or subjects of the verb.

As used herein, the singular form "a", "an" and "the" include plural references and mean "at least one" or "one or more" unless the context clearly dictates otherwise.

Positional or motional terms such as "upper", "lower", "right", "left", "bottom", "below", "lowered", "low", "top", "above", "elevated", "high", "vertical", "horizontal", "front", "back", "backward", "forward", "upstream" and "downstream", as well as grammatical variations thereof, may be used herein for exemplary purposes only, to illustrate the relative positioning, placement or displacement of certain components, to indicate a first and a second component in present illustrations or to do both. Such terms do not necessarily indicate that, for example, a "bottom" component is below a "top" component, as such directions, components or both may be flipped, rotated, moved in space, placed in a diagonal orientation or position, placed horizontally or vertically, or similarly modified.

Unless otherwise stated, the use of the expression "and/or" between the last two members of a list of options for selection indicates that a selection of one or more of the listed options is appropriate and may be made.

In the disclosure, unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended, or within variations expected from the measurement being performed and/or from the measuring instrument being used. When the term "about" precedes a numerical value, it is intended to indicate +/−15%, or +/−10%, or even only +/−5%, and in some instances the precise value.

While this disclosure has been described in terms of certain embodiments and generally associated methods, alterations and permutations of the embodiments and methods will be apparent to those skilled in the art. The present disclosure is to be understood as not limited by the specific embodiments described herein.

To the extent necessary to understand or complete the disclosure of the present invention, all publications, patents, and patent applications mentioned herein, including in particular the applications of the Applicant, are expressly incorporated by reference in their entirety by reference as is fully set forth herein.

Certain marks referenced herein may be common law or registered trademarks of third parties. Use of these marks is by way of example and shall not be construed as descriptive or limit the scope of this disclosure to material associated only with such marks. For instance, poly(dimethylsiloxane-co-methylhydrosiloxane), trimethylsilyl terminated (CAS No. 68037-59-2) can be alternatively purchased from Milliken Chemical as DMH-5A, from Gelest® as HMS-301, from Evonik as Crosslinker 100, or from Siltech Corp. as Silmer H E4, to name a few.

The invention claimed is:

1. A curable composition comprising:
  a) at least one reactive curable silicone vinyl-functional pre-polymer capable of forming a silicone elastomer upon addition-curing thereof; and
  b) a plurality of hydrophilic carbon black particles, dispersed with a dispersant non-covalently within said reactive curable silicone pre-polymer, said dispersant having at least one carbon-black-affinic moiety, having affinity to a hydrophilic surface of the hydrophilic carbon black particles;
  wherein a concentration of the hydrophilic carbon black particles within the composition is at least 0.01%, by weight;
  the carbon black particles having at least one of the following structural properties:
  I) a volatile matter content of at least 1.5%, by weight of the carbon black particles;
  II) a pH of at most 5.0, as measured in a 4 wt. % dispersion of the hydrophilic carbon black particles in aqueous methanol;
  III) an oxygen content of at least 1.0% by weight of the carbon black particles;
  IV) an acid value of the carbon black particles of at least 0.05 mmol/g;
  V) a surface zeta potential of at most −15 mV, as measured at a pH of 12 and a concentration of 2 wt. % in distilled water;
  VI) at least one type of functional group selected from the group consisting of epoxy, hydroxy and carboxylic moieties;
  VII) an $I_D/I_G$ ratio of at least 0.8, wherein $I_D$ and $I_G$ represent the peak intensity maxima of D-band and G-band, respectively, of undeconvoluted spectra, as determined by Raman spectroscopy; and
  VIII) an $AUC_D/AUC_G$ ratio of at least 1.2, wherein $AUC_D$ and $AUC_G$ represent the area under the curve of D-band and G-band, respectively, of deconvoluted spectra, as determined by Raman spectroscopy;
  wherein said dispersant includes an amino-silicone dispersant;
  wherein said amino-silicone dispersant is a non-reactive amino-silicone oil;
  wherein said non-reactive amino-silicone oil is devoid of silanol and alkoxy groups;
  and wherein the weight-per-weight ratio between said hydrophilic carbon black particles and said dispersant is within a range of 0.4:1 to 2:1.

2. The curable composition of claim 1, wherein said carbon black particles have the following structural property: a value of $I_D/I_G$ of said carbon black particles is at least 0.8.

3. The curable composition of claim 1, wherein said carbon black particles have the following structural property: a value of $AUC_D/AUC_G$ of said carbon black particles is at least 1.2.

4. The curable composition of claim 1, wherein said dispersant having at least one carbon-black-affinic moiety includes a branched molecule having a backbone having A atoms, and N branching units branching from said backbone, A being at least 50, and N being at least one, wherein at least one of said backbone and said one or more branching units is siloxane-based, or contains at least one siloxane unit.

5. The curable composition of claim 4, wherein said backbone fulfills at least one of:
  (a) A is at least 60;
  (b) A is at most 3000; and
  (c) A is within a range of 55 to 3000;
  wherein said branching units fulfill at least one of:
  (i) N is at least 2; and
  (ii) N is at, most 15; and
    wherein each of the branching units has a branch spine attached to said backbone, said spine having B atoms, said spine fulfilling at least one of:
    (I) B is at least 4; and
    (II) B is at most 50.

6. The curable composition of claim 4, wherein said at least one carbon-black-affinic moiety is disposed within said branching units, said backbone of said dispersant being a siloxane-based backbone.

7. The curable composition of claim 4, wherein said at least one carbon-black-affinic moiety is disposed within said backbone, at least a portion of said branching units of said dispersant being siloxane-containing branching units.

8. The curable composition of claim 1, wherein the concentration of said dispersant is at least 0.03 wt. % and at most 30 wt. % by total weight of the curable composition.

9. The curable composition of claim 1, wherein the concentration of said plurality of hydrophilic carbon black particles within the composition is at most 30 wt. % by total weight of the curable composition.

10. The curable composition of claim 1, wherein said at least one reactive curable silicone pre-polymer constitutes between 40 wt. % and 95 wt. % by total weight of the curable composition.

11. The curable composition of claim 1, wherein the curable composition comprises at least one addition-curing promoter selected from the group consisting of an addition-cure catalyst, an addition-cure accelerator and at least one three-dimensional network former.

12. The curable composition of claim 11, wherein the addition-curing promoter is an addition-cure catalyst including platinum.

13. The curable composition of claim 11, wherein the at least one addition-curing promoter is a three-dimensional network former including a hydrophobic fumed silica.

14. The curable composition of claim 1, wherein the at least one reactive curable silicone pre-polymer is selected from the group consisting of liquid silicone resins (LSR), room temperature vulcanization (RTV) silicones and polydialkyl siloxanes (PDAS).

15. A curable composition comprising:
  a) at least one reactive curable silicone pre-polymer capable of forming a silicone elastomer upon curing thereof; and
  b) a plurality of hydrophilic carbon black particles, dispersed with a dispersant non-covalently within said reactive curable silicone pre-polymer, said dispersant having at least one carbon-black-affinic moiety, having affinity to a hydrophilic surface of the hydrophilic carbon black particles;

wherein a concentration of the hydrophilic carbon black particles within the composition is at least 0.01%, by weight;

the carbon black particles having at least one of the following structural properties:

I) an $I_D/I_G$ ratio of at least 0.8, wherein $I_D$ and $I_G$ represent the peak intensity maxima of D-band and G-band, respectively, of undeconvoluted spectra, as determined by Raman spectroscopy; and II) an $AUC_D/AUC_G$ ratio of at least 1.2, wherein $AUC_D$ and $AUC_G$ represent the area under the curve of D-band and G-band, respectively, of deconvoluted spectra, as determined by Raman spectroscopy;

wherein the weight-per-weight ratio between said hydrophilic carbon black particles and said dispersant is within a range of 0.4:1 to 2:1.

16. The curable composition of claim 15, wherein the curable composition comprises at least one addition-curing promoter selected from the group consisting of an addition-cure catalyst, an addition-cure accelerator and at least one three-dimensional network former.

17. The curable composition of claim 15, wherein said dispersant includes a silicone-acrylate dispersant.

18. The curable composition of claim 15, wherein said dispersant includes an epoxy-silicone dispersant.

19. The curable composition of claim 15, wherein said dispersant includes an amino-silicone dispersant.

20. The curable composition of claim 19, wherein said amino-silicone dispersant is a non-reactive amino-silicone oil.

21. The curable composition of claim 20, wherein said non-reactive amino-silicone oil is devoid of silanol and alkoxy groups.

* * * * *